(12) United States Patent
Latil et al.

(10) Patent No.: US 12,440,500 B2
(45) Date of Patent: Oct. 14, 2025

(54) PHYTOECDYSONES AND THE DERIVATIVES THEREOF FOR USE IN THE TREATMENT OF NEUROMUSCULAR DISEASES

(71) Applicants: BIOPHYTIS, Paris (FR); SORBONNE UNIVERSITE, Paris (FR)

(72) Inventors: Mathilde Latil, Paris (FR); Pierre Dilda, Paris (FR); René Lafont, Paris (FR); Stanislas Veillet, Savigny sur Orge (FR)

(73) Assignees: BIOPHYTIS, Paris (FR); SORBONNE UNIVERSITE, Paris (FR)

( * ) Notice: Subject to any disclaimer, the term of this patent is extended or adjusted under 35 U.S.C. 154(b) by 795 days.

(21) Appl. No.: 17/439,681

(22) PCT Filed: Mar. 12, 2020

(86) PCT No.: PCT/EP2020/056590
§ 371 (c)(1),
(2) Date: Sep. 15, 2021

(87) PCT Pub. No.: WO2020/187678
PCT Pub. Date: Sep. 24, 2020

(65) Prior Publication Data
US 2022/0160732 A1    May 26, 2022

(30) Foreign Application Priority Data
Mar. 15, 2019 (FR) ..................................... 1902726

(51) Int. Cl.
*A61K 31/575* (2006.01)
*A61K 31/58* (2006.01)
*A61P 21/00* (2006.01)

(52) U.S. Cl.
CPC ............ *A61K 31/575* (2013.01); *A61K 31/58* (2013.01); *A61P 21/00* (2018.01)

(58) Field of Classification Search
CPC ........ A61K 31/575; A61K 31/58; A61P 21/00
See application file for complete search history.

(56) References Cited

U.S. PATENT DOCUMENTS

| | | | |
|---|---|---|---|
| 9,938,315 B2 * | 4/2018 | Lafont | ................. B60F 3/0007 |
| 2013/0337083 A1 * | 12/2013 | Reed | ...................... A61P 21/00 |
| | | | 424/617 |
| 2016/0220624 A1 | 8/2016 | Bily et al. | |
| 2017/0226151 A1 * | 8/2017 | Lafont | ................. B60F 3/0007 |

FOREIGN PATENT DOCUMENTS

| | | | |
|---|---|---|---|
| WO | WO 2015/177469 | * 11/2015 | |
| WO | 2018/197708 | 11/2018 | |

OTHER PUBLICATIONS

Lamb et. al. (Journal of Urology (2016) 195(4) suppl. 1, e1019-e1020). (Year: 2016).*
M. Latil, et al., "P.370 BIO101 demonstrates combined beneficial effects on muscle and motor neurons in a mouse model of severe spinal muscular atrophy", Neuromuscular Disorders, Elsevier Ltd, vol. 29, Sep. 29, 2019, 1 page.
Rashin Mohseni, et al., "Overexpression of SMN2 Gene in Motoneuron-Like Cells Differentiated from Adipose-Derived Mesenchymal Stem Cells by Ponasterone A", Journal of Molecular Neuroscience, vol. 67, No. 2, Dec. 7, 2018, pp. 247-257 (11 pages).
International Search Report and Written Opinion of the ISA for PCT/EP2020/056590 dated Jun. 4, 2020, 15 pages.

* cited by examiner

*Primary Examiner* — Marcos L Sznaidman
(74) *Attorney, Agent, or Firm* — NIXON & VANDERHYE, PC

(57) ABSTRACT

Disclosed are 20-hydroxyecdysone and the derivatives thereof, intended for use in the treatment of a neuromuscular disease such as spinal muscular atrophy or amyotrophic lateral sclerosis, or more particularly in the treatment of a specific disorder of the motor neurons causing alterations in the muscular function occurring in the context of these neuromuscular diseases.

18 Claims, 20 Drawing Sheets

[Fig. 1A]
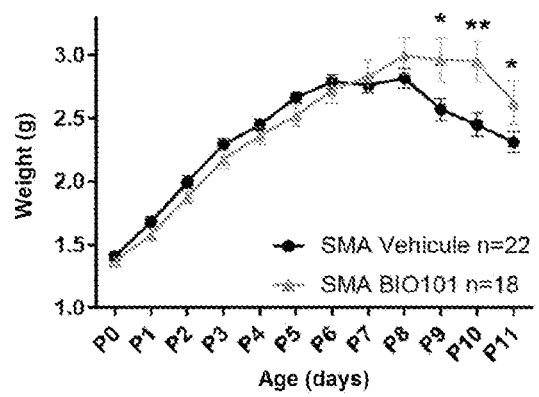
[Fig. 1B]
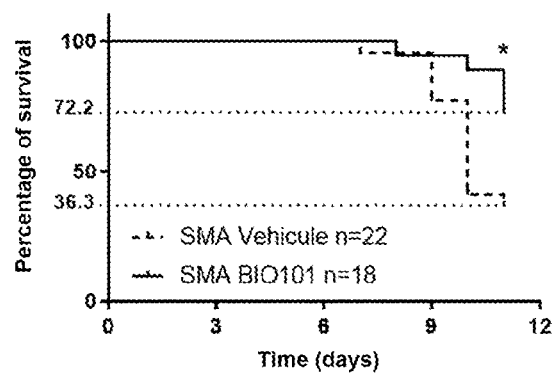

[Fig. 2]
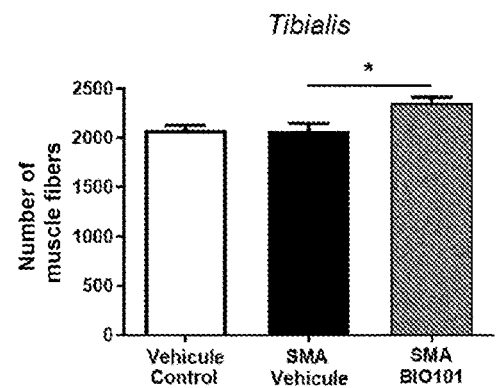
[Fig. 3A]
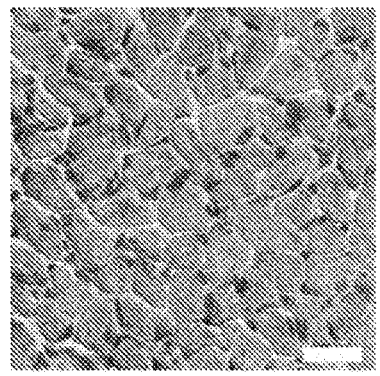

[Fig. 3B]
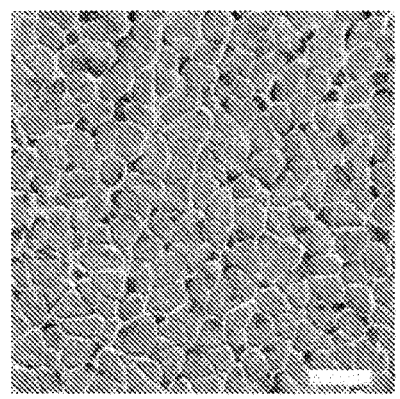
[Fig. 3C]
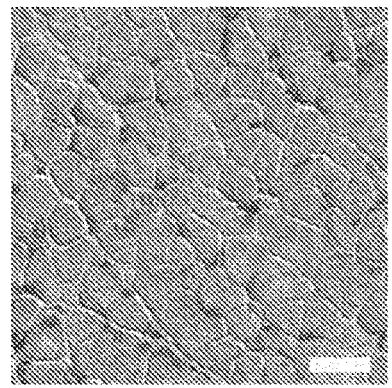

[Fig. 3D]
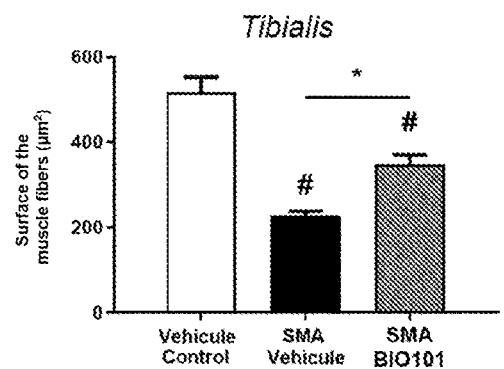
[Fig. 3E]
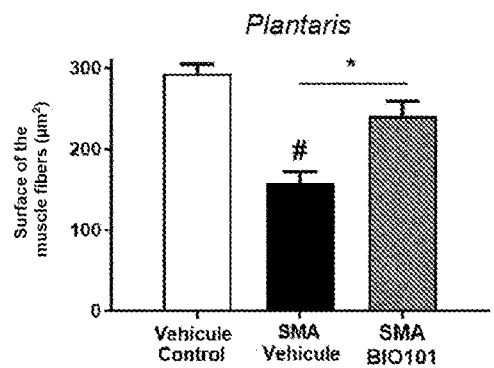

[Fig. 3F]
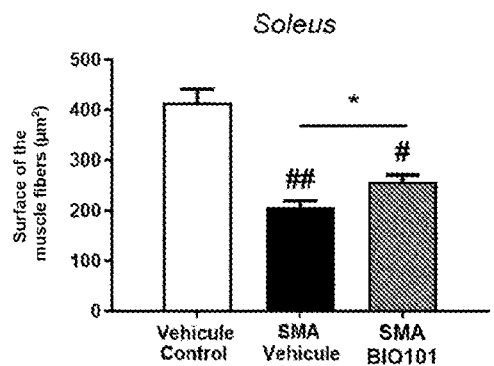
[Fig. 4A]
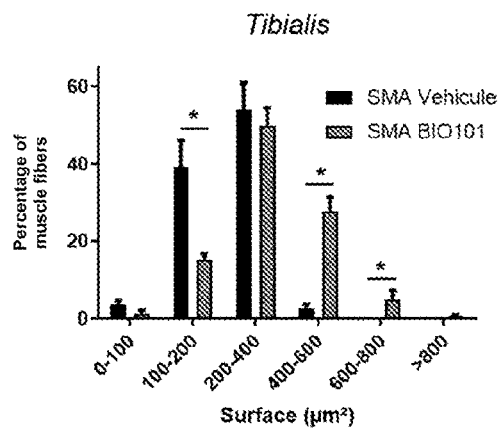

[Fig. 4B]
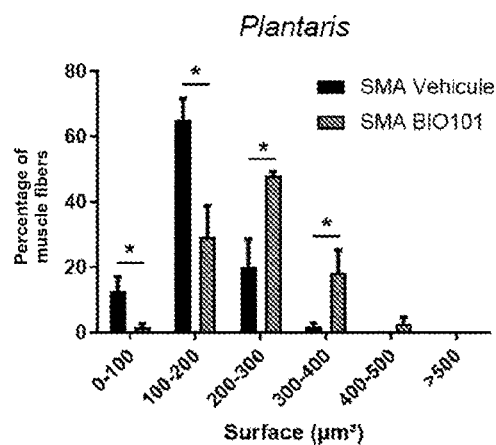
[Fig. 4C]
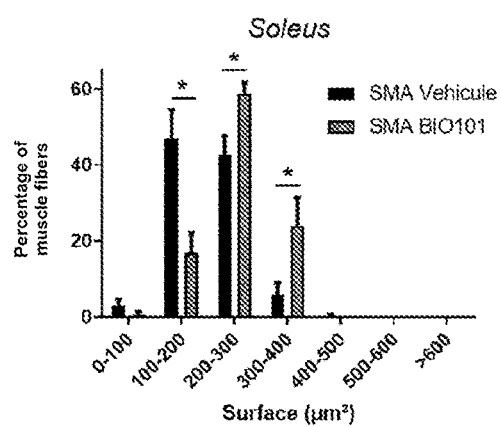

[Fig. 5A]
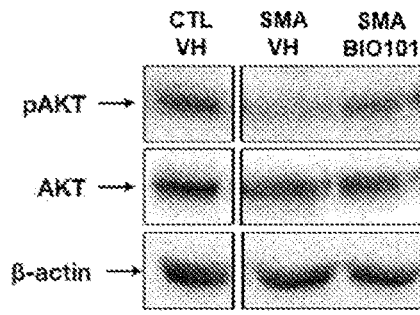
[Fig. 5B]
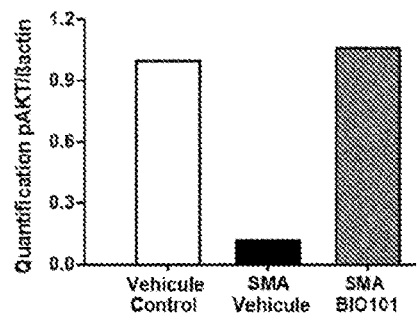
[Fig. 5C]
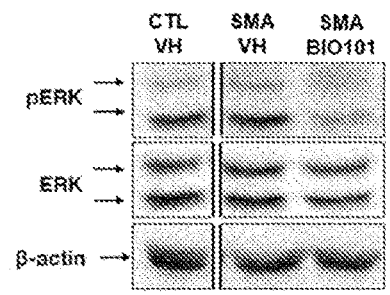

[Fig. 5D]
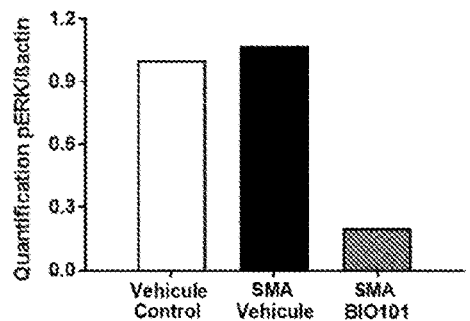
[Fig. 5E]
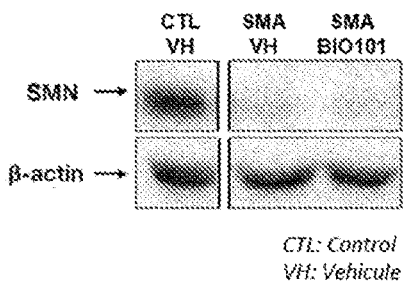
CTL: Control
VH: Vehicule
[Fig. 5F]
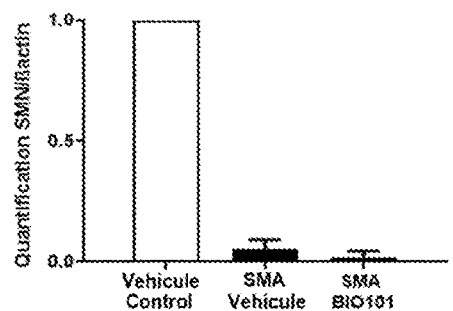

[Fig. 6A]
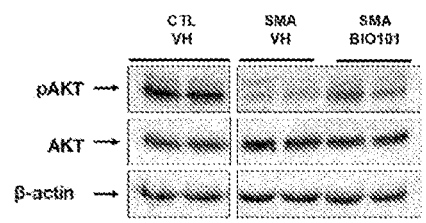
[Fig. 6B]
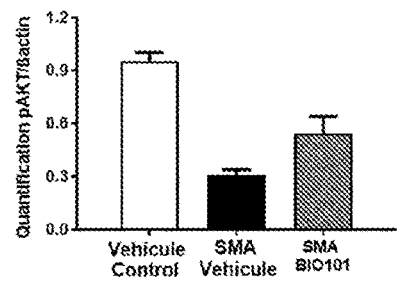
[Fig. 6C]
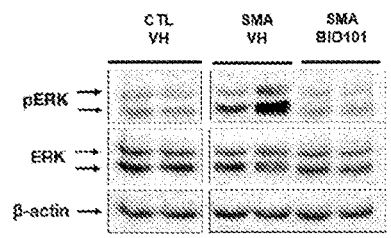

[Fig. 6D]
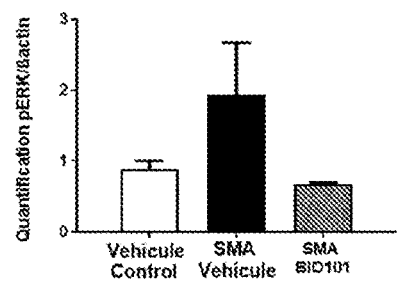
[Fig. 6E]
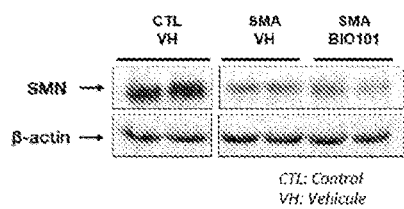
[Fig. 6F]
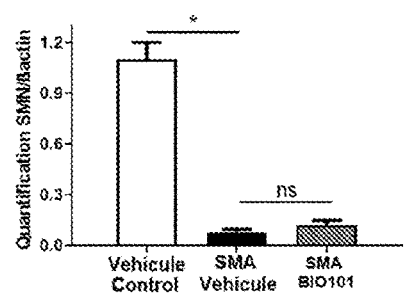

[Fig. 7A]
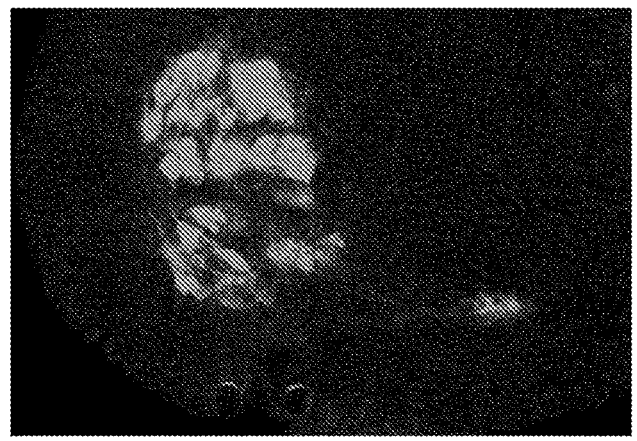
[Fig. 7B]
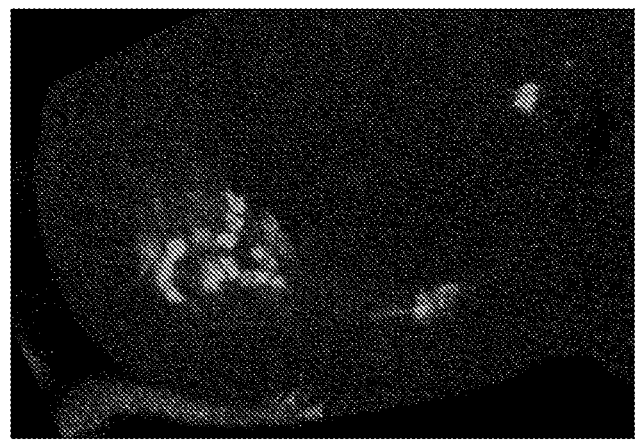

[Fig. 7C]
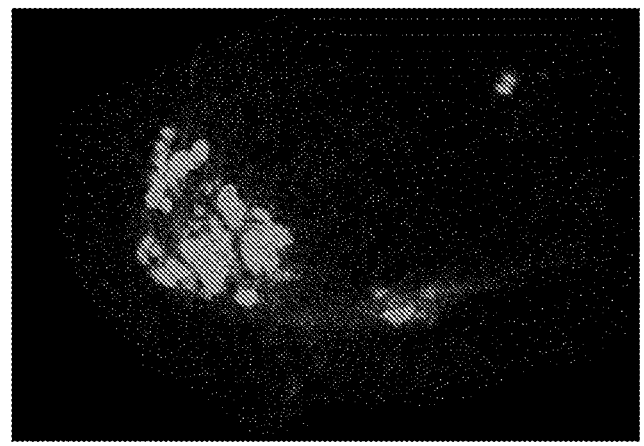
[Fig. 7D]
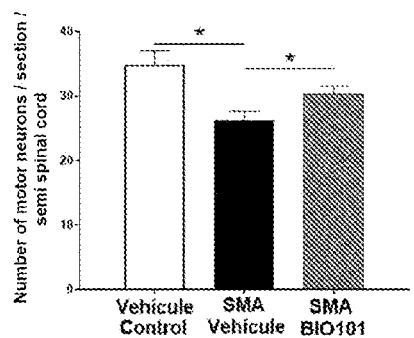

[Fig. 7E]
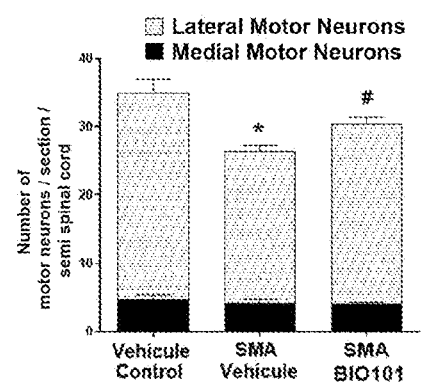
[Fig. 7F]
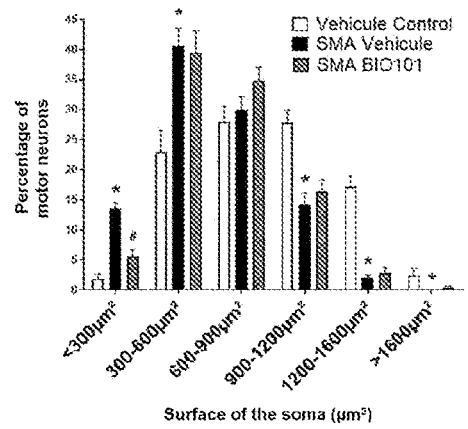

[Fig. 8]
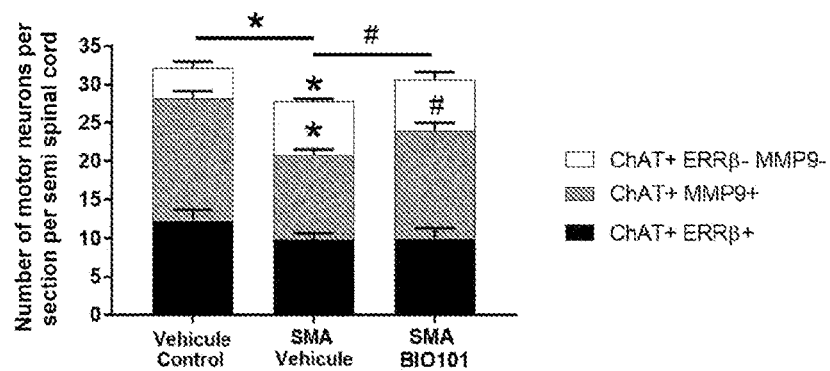
[Fig. 9A]
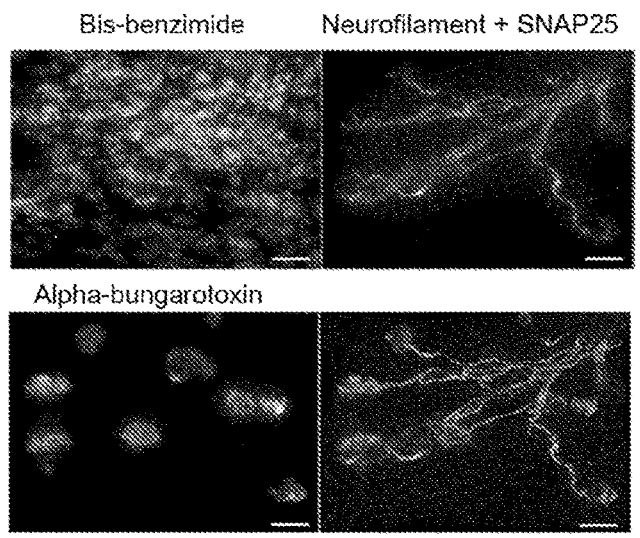

[Fig. 9B]
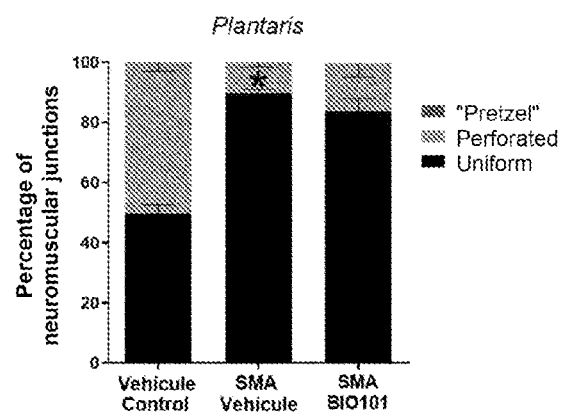
[Fig. 9C]
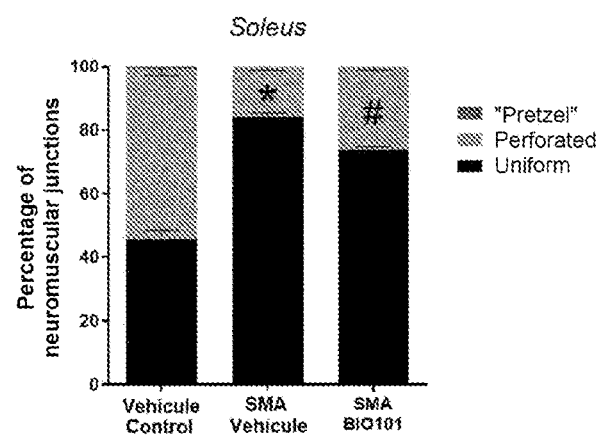

[Fig. 9D]
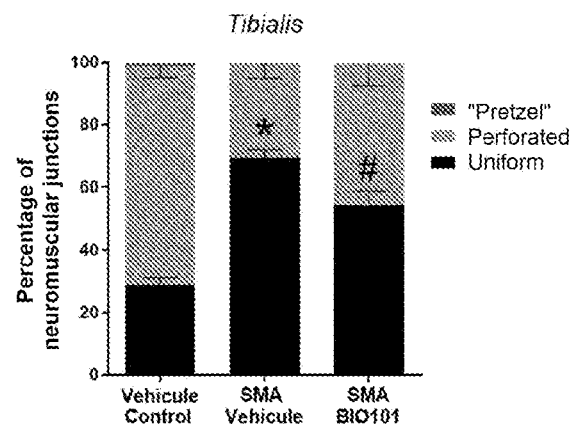
[Fig. 10A]
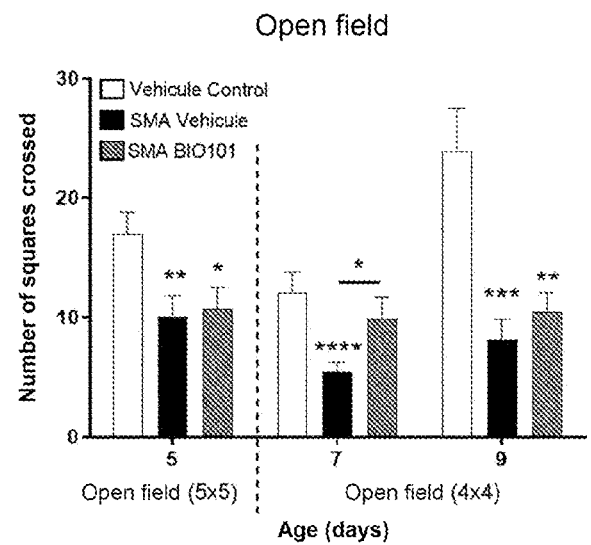

[Fig. 10B]
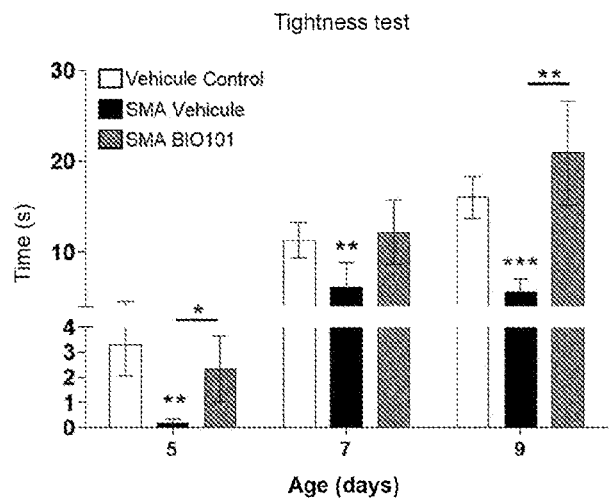
[Fig. 11A]
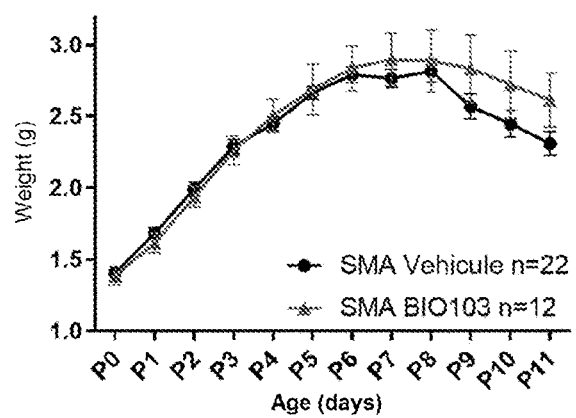

[Fig. 11B]
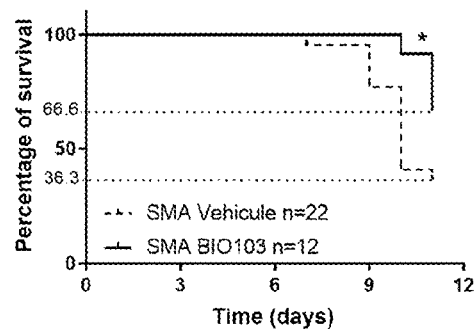
[Fig. 12A]
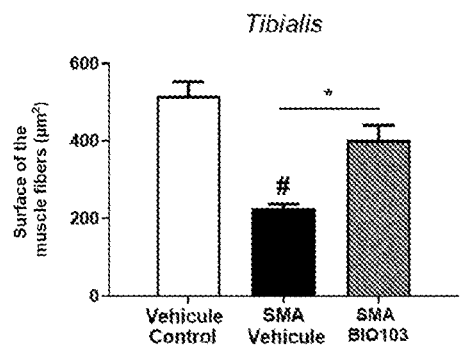
[Fig. 12B]
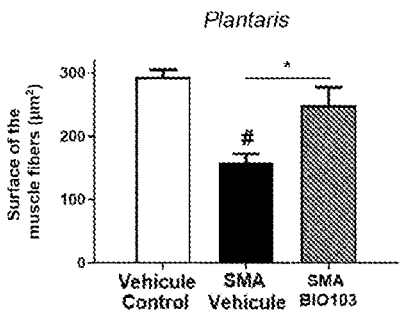

[Fig. 12C]
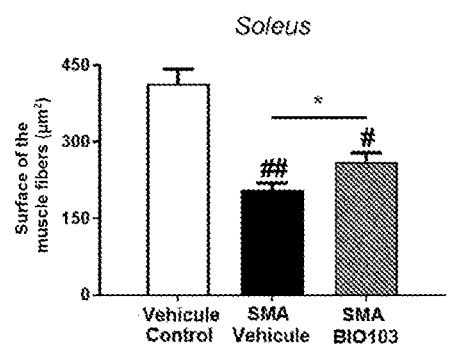
[Fig. 13A]
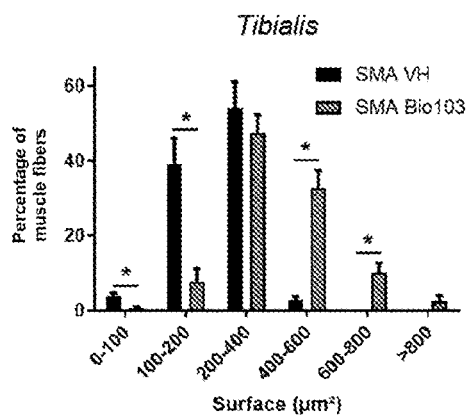

[Fig. 13B]
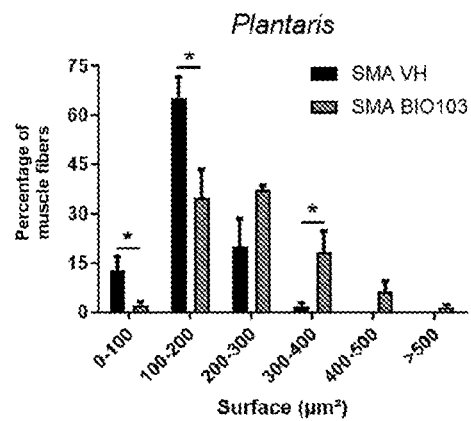
[Fig. 13C]
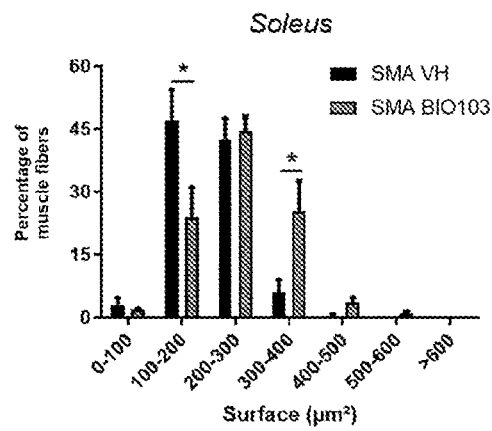

PHYTOECDYSONES AND THE DERIVATIVES THEREOF FOR USE IN THE TREATMENT OF NEUROMUSCULAR DISEASES

This application is the U.S. national phase of International Application No. PCT/EP2020/056590 filed Mar. 12, 2020 which designated the U.S. and claims priority to FR Patent Application No. 1902726 filed Mar. 15, 2019, the entire contents of each of which are hereby incorporated by reference.

TECHNICAL FIELD OF THE INVENTION

The invention relates to the use of phytoecdysones and of semi-synthetic derivatives of phytoecdysones for the treatment of neuromuscular diseases, in particular infantile spinal muscular atrophy and amyotrophic lateral sclerosis.

PRIOR ART

Neuromuscular diseases are characterized by an alteration in the functioning of motor units, composed of motor neurons, neuromuscular junctions and skeletal muscles. Regardless of the origin of the disease, nervous as in infantile spinal muscular atrophy or amyotrophic lateral sclerosis, or muscular, all cause an alteration of the motor function of patients, that can range from a handicap to premature death when the vital muscles are affected. Caring for these neuromuscular diseases is still symptomatic today and represents a substantial economic cost with respect to the level of handicap of patients, the progressivity of these pathologies and the human and material needs that they require. Research and development for therapies that make it possible to alleviate the motor symptoms and the dependency of patients is of certain social and economic interest.

Among these neuromuscular diseases, two are described as specifically affecting motor neurons: infantile spinal muscular atrophy (or SMA), of which the symptoms appear in childhood and amyotrophic lateral sclerosis (or SLA) of which the symptoms occur at the appear in adulthood. These deux neurodegenerative diseases, with different causes and clinical manifestations, have in common progressive muscular denervation, responsible for an amyotrophy (Al-Chalabi and Hardiman, 2013; Crawford and Pardo, 1996).

Infantile spinal muscular atrophy represents the most common cause of child mortality of genetic origin with a prevalence of 1/6,000 to 1/10,000 births (Crawford and Pardo, 1996). Three main types of severity are described, according to the age of appearance of the symptoms and the progression of the clinical affections, ranging from type 1, the most severe, to type 3 of which the lifetime can be greater than 40 years. Patients suffering from SMA have a symmetrical affliction of the skeletal muscles by atrophy of muscle fibers isolated or grouped into fascicles. Almost all SMAs are of a proximal predominance, i.e. affecting the muscles of the trunk and close to the trunk. Progressively, the motor deficit extends, in a first step, to the muscles of the lower limbs, then in a second step, to the muscles of the upper limbs by preferably affecting the extensor muscles. Although having a great clinical heterogeneity, genetic analyses have been able to demonstrate that all the forms of SMA are caused by the mutation of the gene SMN1, for Survival Of Motor Neurons, positioned in chromosomal region 5q13.

In the human genome, there is an inverse centromeric copy of this gene, gene SMN2, that can be found in several copies (Lorson et al., 1998), but which makes it possible to offset only partially the loss of function of the gene SMN1. Indeed, SMN2 has 5 nucleotide differences with SMN1, of which one at the exon 7, favoring the excision thereof by splicing in 90% of the mTNA produced by the gene SMN2. This alternative splicing leads to the production of a truncated and unstable SMN47 protein. Thus, only 10% of the proteins produced by the gene SMN2 are complete and functional (Vitte et al., 1997; Lefebvre et al., 1997). A link has therefore been demonstrated between the number of copies of the gene SMN2, their level of expression and the severity of the disease. The SMN protein is a small ubiquitous protein, located in discrete domains of the cores, called Gems for Gemini of Coiled Bodies, and in the cytoplasm of ells. Although the SMN protein has specifically neuronal roles, such as axonal growth (Mcwhorter et al., 2003) and axonal transport (Akten et al., 2011; Peter et al., 2011), it is also involved in ubiquitous functions such as the biogenesis of nuclear ribonucleoproteins (Buhler et al., 1999; Liu et al., 1997; Zhang et al., 2008) or the regulation of the translation of mRNA (Sanchez et al., 2013). Thus, neither the expression of the SMN protein, nor its cell functions make it possible to directly explain the specific degeneration of motor neurons. However, the development of different animal models and advances in basic research have made it possible to demonstrate that the conditional deletion of the Smn gene solely at neurons does not reproduce the complete symptoms of SMA, nor the motor neuron degeneration (Frugier et al., 2000). Other studies have described a role of the SMN protein in the proper functioning of astrocytes (Rindt et al., 2015), Schwann cells (Hunter et al., 2014), heart cells (Bevan et al., 2010; Heier et al., 2010; Shabadi et al., 2010; Biondi et al., 2010), liver cells (Vitte et al., 2004) and of the vessels (Somers et al., 2016), suggesting a role played by the energy metabolism in the progression and the severity of the disease. Other further studies have focused on the motor unit in SMA and have revealed specific alterations of the neuromuscular junctions (Kariya et al., 2008; Kong et al., 2009; Muray et al., 2008; Biondi et al., 2008), an essential constituent for the survival of motor neurons. Indeed, it has been demonstrated that SMN protein participates in the proper functioning of neuromuscular junctions by acting on the pool of neurotransmitter vesicles, synaptic activity (Torres-Benito et al., 2011), but also the maturation of junctions, a crucial step making it possible to acquire the functionality and maintaining thereof (Kariya et al., 2008; Biondi et al., 2008). On the other hand, the invalidation of the Smn gene in the muscle cells only, generates serious muscular alternations (Cifuentes-Diaz et al., 2001; Rajendra et al., 2007; Lee et al., 2011), such as severe dystrophy (Cifuentes-Diaz et al., 2001), a poor organization of the sarcomeric structure allowing for the contraction (Walker et al., 2008), a decrease in the correct fusion of muscle stem cells, (Nicole et al., 2003), and therefore the differentiation thereof (Shafey et al., 2005). In addition, the myogenic cells of patients suffering from SMA are poor in certain factors, such as CANP (Calcium-Activated Neutral Protease), essential for setting up neuromuscular contacts (Fidzianska et al., 1984; Vrbova et al., 1989). Finally, it has been observed, in vitro, that motor neurons in co-culture with SMA muscle cells degenerate faster (Vrbova et al., 1989).

To date, very different approaches have been considered in order to develop a treatment for SMA. The current research strategies are focusing, for the most part, on the modification of the expression of SMN directly or not, either through increasing the expression of the SMN2 gene, or modifying the splicing SMN2 transcribes, or gene therapies aimed at reintroducing the correct gene. Some research is concentrating on approaches independent of SMN by developing cell therapies or by focusing on activating neuroprotection (Olesoxime) or on improving the muscular function (troponin activator).

Despite dozens of clinical trials in progress in SMA, to date, only two molecules have been approved by the authorities.

The first, a troponin activator (CK-2127107), aims to increase the sarcomeric sensitivity to calcium in order to improve the endurance and the performance of the muscular function (Hwee et al., 2015). This molecule has recently been designated as an orphan drug for SMA by the American regulatory agencies (May 2017).

The second, an anti-sense oligonucleotide (ASO), aims to favor the inclusion of exon 7 of the transcribes produced by SMN2 genes, thus making it possible to overexpress the complete SMN protein by the cells of the spinal cord after intrathecal injections (Hache et al., 2016; Chiriboga et al., 2016). This molecule, developed by the company Biogen and named Nusinersen, has been approved by the American and European authorities and constitutes the first molecule for therapeutic application put on the market to treat severe infantile spinal muscular atrophy, of type 1 and of type 2. The first results obtained with ASO targeting intron 7, whether on animal models (Hua et al., 2010; Passini et al., 2011) or during phases II and III clinical trials on severe SMA patients (Finkel et al., 2016), are very impressive and promising for this lethal disease. However, several grey areas remain as to the use of an oligonucleotide in vivo injected into the central nervous system alone and/or over the long term. First of all, the scientific community lacks hindsight on the long-term tolerance of patients for this type of exogenous molecules targeting gene expression. In addition, further questions relates to the risks inherent in a substantial and uncontrolled overexpression of the SMN protein, protein of which the function has been associated with cell proliferation (Grice et al., 2011). In addition, the efficacy of Nusinersen seems all the more so important as the beginning of the treatment intervenes precociously with regards to the progression of the disease, a clinical situation that is difficult to obtain in light of the diagnosis time and of the clinical course of families. Finally, in SMA, it is important to note the importance of the role played by multi-tissue alterations on the progression of the disease. Yet, Nusinersen is a molecule that does not cross the blood-brain barrier, which imposes treatment by the intrathecal route which makes it possible to target only the neurons and glial cells without targeting other organs such as muscles, the liver, pancreas and the vascular system. Their alterations could, consequently, limit the therapeutic effects of Nusinersen. Finally, patients suffering from type 3 SMA, for which the level of expression of the SMN protein is much higher and for which the vital prognosis is rarely engaged, no treatment authorization has yet been approved, leaving this severity an orphan in terms of treatment.

It therefore appears essential to develop physiological and/or pharmacological approaches complementary to Nusinersen in order to potentiate its protective effects and to limit the clinical courser of patients, their dependency and their Clinical care as much as possible.

Phytoecdysones represent a large family of polyhydroxylated sterols. These molecules are produced by various species of plants (ferns, gymnosperms, angiosperms) and participate in the defense of these plants against pests. The majority phytoecdysone in the plant kingdom is 20-hydroxyecdysone.

Brevet FR 3 021 318 discloses that phytoecdysones, and more particularly 20-hydroxyecdysone (20E), have been the subject of many pharmacological studies. These studies have highlighted the antidiabetic and anabolic properties of this molecule. Its stimulating effects on protein syntheses in muscles are observed in rats in vivo (Syrov et al., 2000; Toth et al., 2008; Lawrence et al., 2012) and on murine myotubes C2C12 in vitro (Gorelick-Feldman et al., 2008). Some of the effects described hereinabove in animal models have been found in clinical studies, still rare. Thus, 20-hydroxyecdysone favors the increase in muscle mass in young athletes (Simakin et al., 1988). Finally, French patent FR 3 021 318 further describes the use of 20-hydroxyecdysone and of 20-hydroxyecdysone derivatives, for treating and preventing sarcopenia and sarcopenic obesity (Lafont et al., 2017).

PRESENTATION OF THE INVENTION

The objective of the present invention is to limit the motor neuron loss linked to neuromuscular diseases as well as the consequences of this degeneration.

Phytoecdysones represent a large family of phytopolyhydroxylated sterols structurally apparent to insect molting hormones. These molecules are produced by many plant species and participate in their defense against pest insects. The majority phytoecdysone is 20-hydroxyecdysone.

The inventors have unexpectedly discovered that phytoecdysones and semi-synthetic derivatives of phytoecdysones significantly improve survival as well as the change in weight in mammals suffering from spinal muscular atrophy. In addition, phytoecdysones and the semi-synthetic derivatives thereof limit muscular atrophy and aplasia present in this pathology and significantly limit the loss of motor neurons of mammals suffering from spinal muscular atrophy.

For this purpose, the invention relates to a composition comprising 20-hydroxyecdysone and/or at least one semi-synthetic derivative of 20-hydroxyecdysone, for its use in the treatment of a specific disorder of the motor neurons in mammals suffering from a neuromuscular disease including an alteration of the muscular function due to the specific disorder of the motor neurons.

In particular embodiments, the invention further responds to the following characteristics, implemented separately or in each of their technically operative combinations.

20-hydroxyecdysone and the derivatives thereof are advantageously purified to pharmaceutical grade.

The 20-hydroxyecdysone used is more preferably in the form of a plant extract rich in 20-hydroxyecdysone or of a composition including 20-hydroxyecdysone as an active agent. Plant extracts rich in 20-hydroxyecdysone are for example extracts of *Stemmacantha carthamoides* (also called *Leuzea carthamoides*), *Cyanotis arachnoidea* and *Cyanotis vaga*.

The extracts obtained are more preferably purified to pharmaceutical grade.

In an embodiment 20-hydroxyecdysone is in form of a plant extract or of a portion of the plant, said plant being chosen from plants containing at least 0.5% of 20-hydroxyecdysone by dry weight of said plant, said extract including at least 95%, and preferably at least 97%, of 20-hydroxyecdysone. Said extrait is more preferably purified to pharmaceutical grade.

Said extract is called in what follows BIO101. It remarkably includes between 0 and 0.05%, by dry weight of the extract, of impurities, as minor compounds, able to affect the safety, the availability or the efficacy of a pharmaceutical application of said extract.

According to an embodiment of the invention, impurities are compounds with 19 or 21 carbon atoms, such as Rubrosterone, Dihydrorubrosterone or Poststerone.

The plant from which BIO101 is produced is more preferably chosen from *Stemmacantha carthamoides* (also called *Leuzea carthamoides*), *Cyanotis arachnoidea* and *Cyanotis vaga*.

The derivatives of 20-hydroxyecdysone are obtained by semi-synthesis and can in particular be obtained in the manner described in European patent application no. EP 15732785.9.

According to a preferred embodiment, the alteration of the muscular function is due to an alteration of the motor neuron function or the degeneration thereof.

In an embodiment, the altered muscular function is that of striated skeletal muscle or of the myocardium.

In an embodiment, the alteration of the muscular function is linked to aplasia and/or atrophy.

In a particular embodiment, the disorder of the motor neurons results from a genetic alteration in mammals suffering from neuromuscular disease.

The term "genetic alteration" means a mutation such as a substitution or an insertion of nucleotide(s) or a deletion of nucleotide(s).

In a particular embodiment, the invention aims for the composition for the use thereof in mammals in treating infantile spinal muscular atrophy (SMA) or amyotrophic lateral sclerosis (SLA).

In a particular embodiment, the invention aims for the composition for the use thereof in mammals in treating a sporadic neuromuscular disease (linked to the random mutation of a causal gene or of one or more susceptibility genes) or a family form wherein a mutation is found of at least one gene chosen from SMN1 that intervenes in the framework of SMA, SOD1, TARDBP encoding the TAR DNA-binding protein 43, VCP (Valosin Containing Protein) FUS/TLS (Fused in sarcoma/translocated in liposarcoma) and C9ORF72 (chromosome 9 open reading frame 72) involved in the framework of SLA.

In a particular embodiment, the treatment of the specific disorder of the motor neurons includes the improvement in motor neuron survival and/or the acceleration in the maturation of the neuromuscular junctions.

In a particular embodiment, phytoecdysones are administered at a dose comprised between 3 and 15 milligrams per kilogram per day in humans. The term "phytoecdysone" here means phytoecdysones in a general manner as well as the derivatives thereof, 20-hydroxyecdysone (in particular in the form of an extract) and the derivatives thereof.

Preferably, phytoecdysones are administered at a dose of 200 to 1,000 mg/day, divided into one or more doses, in human adults, and a dose of 5 to 350 mg/day, divided into one or more doses, in human children or infants. The term "phytoecdysone" here means phytoecdysones in a general manner as well as the derivatives thereof, 20-hydroxyecdysone (in particular in the form of an extract) and the derivatives thereof.

In embodiments the composition includes at least one compound considered as a derivative of phytoecdysone, said at least one compound being of general formula (I):

[Chem. 1]

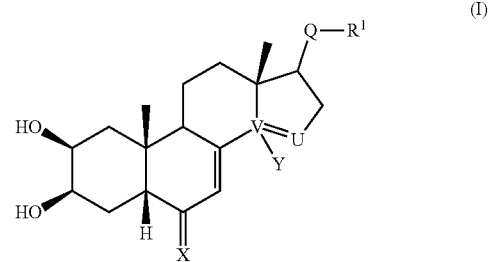

(I)

wherein:
V—U is a carbon-carbon single bond and Y is a hydroxyl group or a hydrogen,
or V—U is an ethylenical C=C bond;
X is an oxygen,
Q is a carbonyl group;
$R^1$ is chosen from: a $(C_1-C_6)W(C_1-C_6)$ group; a $(C_1-C_6)W(C_1-C_6)W(C_1-C_6)$ group; a $(C_1-C_6)W(C_1-C_6)CO_2(C_1-C_6)$ group; a $(C_1-C_6)A$ group, A representing a heterocycle optionally substituted with a group of the OH, OMe, $(C_1-C_6)$, $N(C_1-C_6)$, $CO_2(C_1-C_6)$ type; a $CH_2Br$ group;
W being a heteroatom chosen from N, O and S, preferably O and more preferably S.

In the framework of the present invention "$(C_1-C_6)$" means any alkyl group from 1 to 6 carbon atoms, linear or branched, in particular, the methyl, ethyl, n-propyl, isopropyl, n-butyl, iso-butyl, sec-butyl, t-butyl, n-pentyl, n-hexyl groups. Advantageously it is a methyl, ethyl, isopropyl or t-butyl group, in particular a methyl or ethyl group, more particularly a methyl group.

In a preferred embodiment, in the formula (I):
Y is a hydroxyl group;
$R^1$ is chosen from: a $(C_1-C_6)W(C_1-C_6)$ group; a $(C_1-C_6)W(C_1-C_6)W(C_1-C_6)$ group; a $(C_1-C_6)W(C_1-C_6)CO_2(C_1-C_6)$ group; a $(C_1-C_6)A$ group, A representing a heterocycle optionally substituted with a group of the OH, OMe, $(C_1-C_6)$, $N(C_1-C_6)$, $CO_2(C_1-C_6)$ type;
W being a heteroatom chosen from N, O and S, preferably O and more preferably S.

In embodiments the composition includes at least one compound chosen from the following compounds:
no. 1: (2S,3R,5R,10R,13R,14S,17S)-2,3,14-trihydroxy-10,13-dimethyl-17-(2-morpholinoacetyl)-2,3,4,5,9,11,12,15,16,17-decahydro-1H-cyclopenta[a]phenanthren-6-one,
no. 2: (2S,3R,5R,10R,13R,14S,17S)-2,3,14-trihydroxy-17-[2-(3-hydroxypyrrolidin-1-yl)acetyl]-10,13-dimethyl-2,3,4,5,9,11,12,15,16,17-decahydro-1H-cyclopenta[a]phenanthren-6-one;
no. 3: (2S,3R,5R,10R,13R,14S,17S)-2,3,14-trihydroxy-17-[2-(4-hydroxy-1-piperidyl)acetyl]-10,13-dimethyl-2,3,4,5,9,11,12,15,16,17-decahydro-1H-cyclopenta[a]phenanthren-6-one;
no. 4: (2S,3R,5R,10R,13R,14S,17S)-2,3,14-trihydroxy-17-[2-[4-(2-hydroxyethyl)-1-piperidyl]acetyl]-10,13-dimethyl-2,3,4,5,9,11,12,15,16,17-decahydro-1H-cyclopenta[a]phenanthren-6-one;
no. 5: (2S,3R,5R,10R,13R,14S,17S)-17-[2-(3-dimethylaminopropyl (methyl)amino)acetyl]-2,3,14-trihydroxy-10,13-dimethyl-2,3,4,5,9,11,12,15,16,17-decahydro-1H-cyclopenta[a]phenanthren-6-one;

no. 6: 2-[2-oxo-2-[(2S,3R,5R,10R,13R,14S,17S)-2,3,14-trihydroxy-10,13-dimethyl-6-oxo-2,3,4,5,9,11,12,15,16,17-decahydro-1H-cyclopenta[a]phenanthren-17-yl]ethyl]ethyl sulfanylacetate;

no. 7: (2S,3R,5R,10R,13R,14S,17S)-17-(2-ethylsulfanylacetyl)-2,3,14-trihydroxy-10,13-dimethyl-2,3,4,5,9,11,12,15,16,17-decahydro-1H-cyclopenta[a]phenanthren-6-one;

no. 8: (2S,3R,5R,10R,13R,14S,17S)-2,3,14-trihydroxy-17-[2-(2-hydroxyethyl sulfanyl)acetyl]-10,13-dimethyl-2,3,4,5,9,11,12,15,16,17-decahydro-1H cyclopenta[a]phenanthren-6-one.

In embodiments the composition includes at least one compound considered as a derivative of phytoecdysone, said at least one compound being of general formula (II):

[Chem. 2]

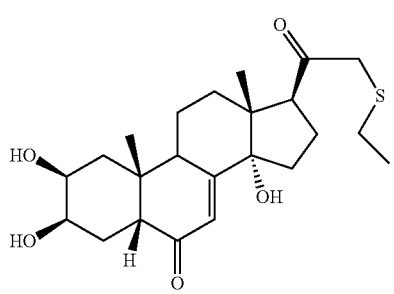

(II)

The compound of formula (II) is in what follows called BIO103.

In embodiments the composition is incorporated into a pharmaceutically acceptable formulation that can be administered orally.

In the framework of the present invention the term "pharmaceutically acceptable" means that which is useful in the preparation of a pharmaceutical composition, which is generally safe, non-toxic and which is acceptable for veterinary as well as human pharmaceutical use.

BRIEF DESCRIPTION OF THE FIGURES

The invention shall be better understood when reading the following description, given by way of a non-limiting example, and given in reference to the figures which show:

FIG. 1A shows the curve of the change in weight of SMA mice treated with a vehicle or with BIO101 from birth (P0) to 11 days post-natal (P11). Here and in the rest of the description, P corresponds to the number of days after birth (postnatal), n corresponds to the size of the sample and p corresponds to the "p value" used to quantify the statistical significance of a result;

FIG. 1B is a Kaplan-Meier representation of the pre-P11 survival curves of SMA mice treated with the vehicle or with BIO101 from P0 to P11;

FIG. 2 is a histogram showing the total number of muscle fibers of a muscle Tibialis anterior (Tibialis) of healthy control mice (vehicle control), SMA treated with the vehicle (SMA vehicle), or SMA treated with BIO101 (SMA BIO101) from P0 to P11;

FIG. 3A is an image representative of the cross-section of the muscle Tibialis anterior with a Hematoxylin and Eosin stain, of healthy control mice (control);

FIG. 3B is an image representative of the cross-section of the muscle Tibialis anterior with a Hematoxylin and Eosin stain, of SMA mice treated with the vehicle (SMA vehicle) from P0 to P11;

FIG. 3C is an image representative of the cross-section of the muscle Tibialis anterior with a Hematoxylin and Eosin stain, of SMA mice treated with BIO101 (SMA BIO101) from P0 to P11;

FIG. 3D is a histogram showing the cross-section surface of muscle fibers of the muscle Tibialis anterior (Tibialis) of healthy control mice (vehicle control), SMA treated with the vehicle (SMA vehicle) from P0 to P11, or SMA treated with BIO101 (SMA BIO101) from P0 to P11;

FIG. 3E is a histogram showing the cross-section surface of muscle fibers of the muscle Plantaris of healthy control mice (vehicle control), SMA treated with the vehicle (SMA vehicle) from P0 to P11, or SMA treated with BIO101 (SMA BIO101) from P0 to P11;

FIG. 3F is a histogram showing the cross-section surface of muscle fibers of the muscle Soleus of healthy control mice (vehicle control), SMA treated with the vehicle (SMA vehicle) from P0 to P11, or SMA treated with BIO101 (SMA BIO101) from P0 to P11;

FIG. 4A is a histogram showing the distribution of the muscle fibers of the muscle Tibialis anterior (Tibialis) according to their cross-section surface, in SMA mice treated with the vehicle (SMA vehicle) from P0 to P11, or SMA treated with BIO101 (SMA BIO101) from P0 to P11;

FIG. 4B is a histogram showing the distribution of the muscle fibers of the muscle Plantaris according to their cross-section surface, in SMA mice treated with the vehicle (SMA vehicle) from P0 to P11, or SMA treated with BIO101 (SMA BIO101) from P0 to P11;

FIG. 4C is a histogram showing the distribution of the muscle fibers of the muscle Soleus according to their cross-section surface, in SMA mice treated with the vehicle (SMA vehicle) from P0 to P11, or SMA treated with BIO101 (SMA BIO101) from P0 to P11;

FIG. 5A shows a Western Blot showing the phosphorylation of AKT of the muscle Plantaris of healthy control mice (CTL VH), of SMA mice treated with the vehicle (SMA VH) from P0 to P11, or SMA treated with BIO101 (SMA BIO101) from P0 to P11;

FIG. 5B shows a histogram showing the quantification by densitometry of the phosphorylation of AKT of the muscle Plantaris of healthy control mice (CTL VH), of SMA mice treated with the vehicle (SMA VH) from P0 to P11, or SMA treated with BIO101 (SMA BIO101) from P0 to P11;

FIG. 5C shows a Western Blot showing the phosphorylation of ERK of the muscle Plantaris of healthy control mice (CTL VH), of SMA mice treated with the vehicle (SMA VH) from P0 to P11, or SMA treated with BIO101 (SMA BIO101) from P0 to P11;

FIG. 5D shows a histogram showing the quantification by densitometry of the phosphorylation of ERK of the muscle Plantaris of healthy control mice (CTL VH), of SMA mice treated with the vehicle (SMA VH) from P0 to P11, or SMA treated with BIO101 (SMA BIO101) from P0 to P11;

FIG. 5E shows a Western Blot showing the level of expression of the SMN protein of the muscle Plantaris of healthy control mice (CTL VH), of SMA mice treated with the vehicle (SMA VH) from P0 to P11, or SMA treated with BIO101 (SMA BIO101) from P0 to P11;

FIG. 5F shows a histogram showing the quantification by densitometry of the SMN protein of the muscle Plantaris of healthy control mice (CTL VH), of SMA mice treated with the vehicle (SMA VH) from P0 to P11, or SMA treated with BIO101 (SMA BIO101) from P0 to P11;

FIG. 6A shows a Western Blot showing the phosphorylation of AKT at the spinal cord of healthy control mice (CTL VH), of SMA mice treated with the vehicle (SMA VH) from P0 to P11, or SMA treated with BIO101 (SMA BIO101) from P0 to P11;

FIG. 6B shows a histogram showing the quantification by densitometry of the phosphorylation of AKT at the spinal cord of healthy control mice (CTL VH), of SMA mice treated with the vehicle (SMA VH) from P0 to P11, or SMA treated with BIO101 (SMA BIO101) from P0 to P11;

FIG. 6C shows a Western Blot showing the phosphorylation of ERK at the spinal cord of healthy control mice (CTL VH), of SMA mice treated with the vehicle (SMA VH) from P0 to P11, or SMA treated with BIO101 (SMA BIO101) from P0 to P11;

FIG. 6D shows a histogram showing the quantification by densitometry of the phosphorylation of ERK at the spinal cord of healthy control mice (CTL VH), of SMA mice treated with the vehicle (SMA VH) from P0 to P11, or SMA treated with BIO101 (SMA BIO101) from P0 to P11;

FIG. 6E shows a Western Blot showing the level of expression of the SMN protein at the spinal cord of healthy control mice (CTL VH), of SMA mice treated with the vehicle (SMA VH) from P0 to P11, or SMA treated with BIO101 (SMA BIO101) from P0 to P11;

FIG. 6F shows a histogram showing the quantification by densitometry of the SMN protein at the lumbar level of the spinal cord of healthy control mice (CTL VH), of SMA mice treated with the vehicle (SMA VH) from P0 to P11, or SMA treated with BIO101 (SMA BIO101) from P0 to P11;

FIG. 7A is an image representative of immunofluorescence labeling of the motor neurons (anti-Choline Acetyltransferase) on a cross-section of the lumbar region of the spinal cord of healthy control mice (Vehicle Control);

FIG. 7B is an image representative of immunofluorescence labeling of the motor neurons (anti-Choline Acetyltransferase) on a cross-section of the lumbar region of the spinal cord of SMA mice treated with the vehicle from P0 to P11 (SMA Vehicle);

FIG. 7C is an image representative of immunofluorescence labeling of the motor neurons (anti-Choline Acetyltransferase) on a cross-section of the lumbar region of the spinal cord of SMA mice treated with BIO101 from P0 to P11 (SMA BIO101);

FIG. 7D shows a histogram of the total number of motor neurons per section per semi ventral spinal cord of healthy control mice (vehicle control), SMA treated with the vehicle (SMA vehicle) from P0 to P11, SMA treated with BIO101 (SMA BIO101) from P0 to P11;

FIG. 7E shows a histogram of the number of lateral and distal motor neurons per section per semi ventral spinal cord of healthy control mice (vehicle control), SMA treated with the vehicle (SMA vehicle) from P0 to P11, SMA treated with BIO101 (SMA BIO101) from P0 to P11;

FIG. 7F is a histogram showing the distribution of the motor neurons according to the soma surface thereof, by section by semi ventral spinal cord of healthy control mice (vehicle control), SMA treated with the vehicle (SMA vehicle) from P0 to P11, SMA treated with BIO101 (SMA BIO101) from P0 to P11;

FIG. 8 is a histogram showing the distribution of the number of the different types of motor neurons (slow, intermediate and fast) in the groups of healthy control mice (vehicle control n≥5), SMA treated with the vehicle (SMA vehicle, n=5) from P0 to P11, or SMA treated with BIO101 (SMA BIO101, n≥6) from P0 to P11; Slow motor neurons are characterized by the expression of the ChAT+ERRβ+ markers, fast motor neurons by the expression of the ChAT+MMP9+ markers and the intermediate motor neurons by the expression of the ChAT+ERRβ-MMP9-markers. The significance is considered as reached for p<0.05. "*" indicates a significant difference compared to the group of vehicle control mice. "#" indicates a significant difference compared to the group of SMA vehicle mice.

FIG. 9A shows photos of immunofluorescence labeling of the neuromuscular junction by the different markers of the pre-synaptic face (Neurofilament and SNAP25) and of the post-synaptic face (α-bungarotoxin). The staining with bisbenzimide makes it possible to identify the cores. The scale bar represents 10 µm.

FIG. 9B is a histogram showing the distribution of the percentage of the different types of neuromuscular junctions according to the maturation state thereof (of the so-called "pretzel" shape: mature; perforated: in the process of maturation; or uniform: immature) in the muscle Plantaris in the groups of healthy control mice (vehicle control, n=4), SMA treated with the vehicle (SMA vehicle, n=4) from P0 to P11, or SMA treated with BIO101 (SMA BIO101, n=4) from P0 to P11. "*" indicates a significant difference (p<0.05) compared to the group of vehicle control mice.

FIG. 9C is a histogram showing the distribution of the percentage of the different types of neuromuscular junctions according to the maturation state thereof (of the so-called "pretzel" shape: mature; perforated: in the process of maturation; or uniform: immature) in the muscle Soleus in the groups of healthy control mice (vehicle control, n=4), SMA treated with the vehicle (SMA vehicle, n=4) from P0 to P11, or SMA treated with BIO101 (SMA BIO101, n=4) from P0 to P11. "*" indicates a significant difference (p<0.05) compared to the group of vehicle control mice. "#" indicates a significant difference compared to the group of SMA vehicle mice.

FIG. 9D is a histogram showing the distribution of the percentage of the different types of neuromuscular junctions according to the maturation state thereof (of the so-called "pretzel" shape: mature; perforated: in the process of maturation; or uniform: immature) in the muscle Tibialis anterior in the groups of healthy control mice (vehicle control, n=4), SMA treated with the vehicle (SMA vehicle, n=4) from P0 to P11, or SMA treated with BIO101 (SMA BIO101, n=4) from P0 to P11. "*" indicates a significant difference (p<0.05) compared to the group of vehicle control mice. "#" indicates a significant difference compared to the group of SMA vehicle mice.

FIG. 10A shows the motor performance evaluated by the Open field test at days P5, P7 and P9 of healthy control mice (vehicle control, n=13), SMA treated with the vehicle (SMA vehicle, n=11) from P0 to P9, or SMA treated with BIO101 (SMA BIO101, n=12) from P0 to P9. The number of "*" indicates the significant difference compared to the group of vehicle control mice (*=p<0.05, =p<0.01, *=p<0.001 and ****=p<0.0001).

FIG. 10B shows the muscle fatigue evaluated by the grip test at days P5, P7 and P9 of healthy control mice (vehicle control, n=17), SMA treated with the vehicle (SMA vehicle, n=11) from P0 to P9, or SMA treated with BIO101 (SMA BIO101, n=10) from P0 to P9. The number of "*" indicates the significant difference compared to the group of vehicle control mice (*=p<0.05, =p<0.01 and *=p<0.001).

FIG. 11A shows the weight curve of SMA mice treated with the vehicle or with BIO103 from P0 to P11;

FIG. 11B is a Kaplan-Meier representation of the pre-P11 survival curves of SMA mice treated with the vehicle or with BIO101 from P0 to P11;

FIG. 12A is a histogram showing the cross-section surface of the muscle fibers of the muscle Tibialis anterior (Tibialis) of healthy control mice (vehicle control), SMA treated with the vehicle (SMA vehicle) from P0 to P11, or SMA treated with BIO103 (SMA BIO101) from P0 to P11;

FIG. 12B is a histogram showing the cross-section surface of muscle fibers of the muscle Plantaris of healthy control mice (vehicle control), SMA treated with the vehicle (SMA vehicle) from P0 to P11, or SMA treated with BIO103 (SMA BIO101) from P0 to P11;

FIG. 12C is a histogram showing the cross-section surface of muscle fibers of the muscle Soleus of healthy control mice (vehicle control), SMA treated with the vehicle (SMA vehicle) from P0 to P11, or SMA treated with BIO103 (SMA BIO101) from P0 to P11;

FIG. 13A is a histogram showing the distribution of the muscle fibers of the muscle Tibialis anterior (Tibialis) according to the cross-section surface, of SMA mice treated with the vehicle (SMA vehicle) from P0 to P11, or SMA treated with BIO103 (SMA BIO103) from P0 to P11;

FIG. 13B is a histogram showing the distribution of the muscle fibers of the muscle Plantaris according to the cross-section surface, of SMA mice treated with the vehicle (SMA vehicle) from P0 to P11, or SMA treated with BIO103 (SMA BIO103) from P0 to P11;

FIG. 13C is a histogram showing the distribution of the muscle fibers of the muscle Soleus according to the cross-section surface, of SMA mice treated with the vehicle (SMA vehicle) from P0 to P11, or SMA treated with BIO103 (SMA BIO103) from P0 to P11;

DESCRIPTION OF EMBODIMENTS

The invention will be described hereinafter in the particular context of some of its preferred and non-limiting fields of application.

1. Method of Purification of BIO101

BIO101 is prepared from 90%-pure 20-hydroxyecdysone, according to the following steps:
i) hot dissolution of 90%-pure 20-hydroxyecdysone in methanol, filtration and partial concentration,
ii) adding 3 volumes of acetone,
iii) cooling to a temperature comprised between 0 and 5° C., under stirring,
iv) filtering of the precipitate obtained,
v) successive rinsing with acetone and water, and
vi) drying.

This purification calls into play a process of recrystallization suitable for this molecule and able to be produced on an industrial scale.

The filtering of step i) is carried out thanks to a 0.2 μm particle filter.

The partial concentration of step i) is advantageously carried out by vacuum distillation, at a temperature of about 50° C., in the presence of MeOH.

Step vi) of drying is carried out in a vacuum at a temperature of about 50° C.

2. Method of Synthesis of BIO103

BIO103 is obtained via semi-synthesis from 20-hydroxyecdysone then purification to pharmaceutical grade according to the following method of preparation:

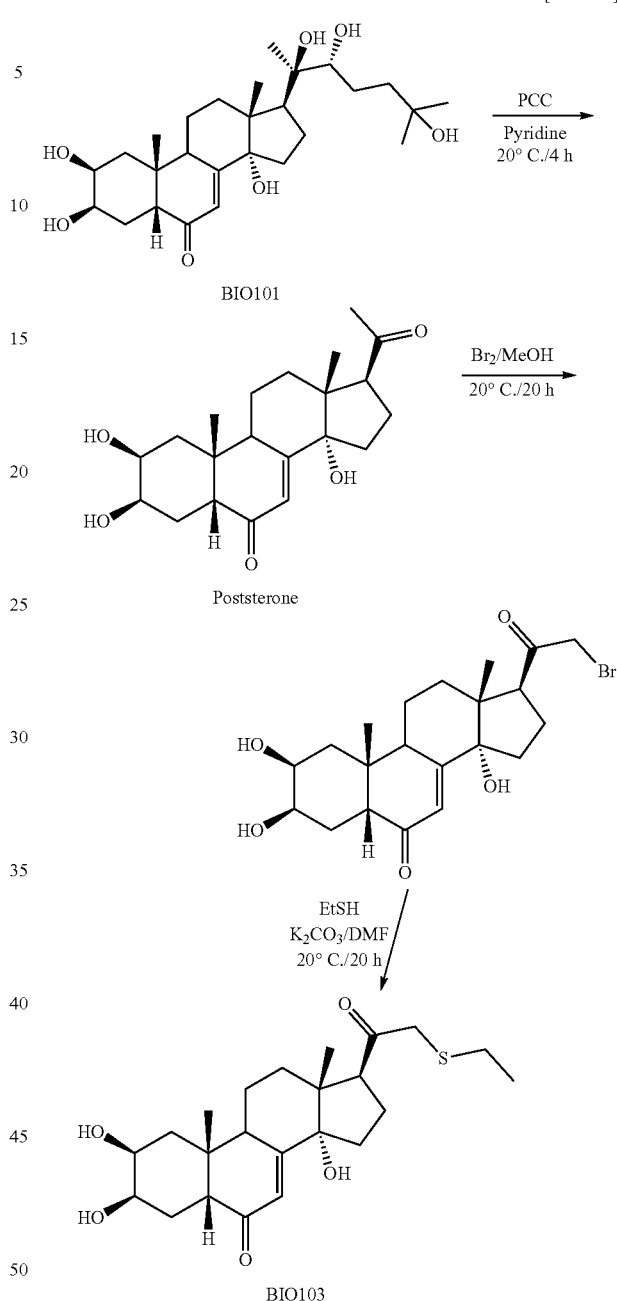

[Chem. 3]

Synthesis Diagram of BIO103 in 3 Steps:
I) oxidative cleavage of the side chain of 20-hydroxyecdysone between carbons C20 and C22 in order to obtain poststerone (protocol known to those skilled in the art),
II) introduction of a bromine atom at position C21,
III) reaction of the bromine compound thus obtained with ethanethiol.

3. Biological Activity of BIO101 and BIO103 a. Phenotypic Analysis of the Effects of BIO101

A severe SMA mouse model was used on an FVB/NRj gene pool, characterized by the invalidation of the exon 7 of the murine gene Smn and expressing 2 copies of the human transgene SMN2 (Smn$^{\Delta7/\Delta7}$; huSMN2$^{+/+}$) (Hsieh et al., 2000). The mice resulting from these crossings having the "FVB/NRj-Smn$^{\Delta7/\Delta7}$ huSMN2$^{+/+}$ 2 copies" genotype are described as "SMA". These mice are characterized by progressive growth failure which is observed starting from 4 days post-natal and have a degeneration of about 50% of the motor neurons of the ventral horn of the spinal cord at the end of life, progressive muscular atrophy and an average lifespan of about 12 days (Hsieh et al., 2000). The mice having the "FVB/NRj-Smn$^{+/\Delta7}$ huSMN2$^{++}$ 2 copies" genotype have no particular phenotype and are used as so-called "control" mice. The mice were treated via daily gavage of a dose of 50 mg/kg, either with the molecule BIO101 complexed to a vehicle (cyclodextrin in the present case), or with the vehicle alone (VH). The weight and the survival were analyzed on a daily basis until P11. In the rest of the description, n corresponds to the size of the sample and p corresponds to the "p value" used to quantify the statistical significance of a result.

The results demonstrate that BIO101 alone (n=18, with n for the size of the sample), in daily oral treatment from birth of the mice, makes it possible to significantly limit (p<0.05) the loss of weight of the animals visible from 9 days post-natal in comparison with animals treated with the vehicle (n=22) (FIG. 1A) and significantly reduces (p<0.05) pre-P11 mortality of the animals treated (FIG. 1B).

b. Analysis of the Muscular Trophic Effects of BIO101

At P11, one hour after their last gavage, the treated mice were anaesthetized with pentobarbital 1% at 6 µL/g of mouse then the extensor muscles Soleus, with a mixed typology, extensor Plantaris, with a fast typology, and flexor Tibialis, with a fast typology, were sampled in order to conduct histological or molecular studies.

After sampling, the muscles Soleus, Plantaris and Tibialis were included individually in a preservation medium then frozen in cooled isopentane. For each muscle, medial cross-sections 10 µm thick were realized. These sections were stained with Hematoxyline-Eosin, dehydrated and mounted in an inclusion medium. The images of these sections were taken with a microscope (with a magnification ×200). In order to obtain images with an impression of relief, the differential interference contrast technique was used. From these images, the number of muscle fibers of each muscle and the cross-section surface of 20% of these fibers were counted using image processing software (FIG. 2).

The histological analysis of the cross-sections of the sampled muscles stained with Hematoxyline-Eosin, shows a beneficial effect of BIO101 on muscle aplasia (number of muscle fibers). Indeed, in the Tibialis, the number of muscle fibers of SMA mice treated with BIO101 increases significantly compared to the number of fibers of the animals treated with the vehicle (respectively 2,358 and 2,069 fibers (+14%), p<0.05).

Interestingly, the muscular atrophy present in the SMA mice is limited by the treatment, regardless of the nature and typology of the muscles. Indeed, the treatment with BIO101 makes it possible to significantly limit the atrophy of the three muscles studied: flexor or extensor.

The atrophy of the muscle fibers in an SMA context (FIG. 3A) in relation to healthy control mice (FIG. 3B) is indeed visible on the histological sections of Tibialis and the quantification of the cross-section surface of the muscle fibers shows that this atrophy is 56.1% in the Tibialis of SMA mice (n=4) in relation to control mice (n=4) (FIG. 3D). This atrophy is significantly reduced (p<0.05) to 32.7% at P11 thanks to a treatment with BIO101 (n=4) (FIG. 3C and FIG. 3D). The same applies for the Plantaris where a significant atrophy of the muscle fibers of 46% is observed in SMA mice in relation to healthy control mice (p<0.05) and where the treatment with BIO101 significantly limits this atrophy to 17.9% (p<0.05) (FIG. 3E) and in the Soleus (50.2% for SMA mice compared to the control (p<0.01) versus 37.8% with a treatment with BIO101, p<0.05) (FIG. 3F).

In order to conduct a finer analysis of the effects of BIO101 on the atrophy, the distribution of the muscle fibers by cross-section surface categories was evaluated. According to their nature, the muscle fibers have a different cross-section surface. Type I fibers, characterized by a slow contraction, have a size less than that of type II fibers, characterized by a fast contraction. The significant reduction in the atrophy by the molecule BIO101 observed with a treatment of SMA mice from P0 to P11, results in a significant effect of this treatment on the distribution of the fibers according to their cross-section surface in the three muscles studied of SMA mice treated with BIO101 in comparison with the SMA mice treated with the vehicle (FIGS. 4A, 4B and 4C). In the muscle Tibialis of SMA mice treated with BIO101 from P0 to P11, a significant increase is observed in the proportion of fibers that have a cross-section surface comprised between 400 and 800 µm$^2$ while the proportion of fibers that have a cross-section surface comprised between 100 and 200 µm$^2$ decreases significantly (p<0.05) in relation to the group of SMA vehicle mice (FIG. 4A). In the muscle Plantaris and in the Soleus of SMAs treated with BIO101 from P0 to P11, an increase is observed in the proportion of fibers that have a cross-section surface between 200 and 400 µm$^2$ accompanied by a decrease in those that have a cross-section surface between 0 and 100 µm$^2$ for the muscle Plantaris (FIG. 4B) and of those that have a cross-section surface between 100 and 200 µm$^2$ for the Soleus (FIG. 4C).

c. Molecular Analyses

Prior studies have made it possible to demonstrate an under-activation of the AKT/CREB pathway and an over-activation of the ERK/Elk-1 pathway associated with a low expression of the SMN protein at the ventral horn of the spinal cord of "FVB/NRj-Smn$^{\Delta7/\Delta7}$ huSMN2$^{+/+}$ 2 copies" transgenic mice used as a severe murine model of type II spinal muscular atrophy, suggesting a role of these pathways in the disease (Branchu et al., 2013).

The frozen muscle Plantaris was homogenized in extraction buffer by mechanical grinding. The supernatant containing the protein extract was sampled, then the protein extracts were then dosed according to the Lowry protein assay. An electrophoresis on SDS-PAGE gel was conducted, then the separated proteins were transferred onto membranes. The primary antibodies used were the following: mouse monoclonal anti-SMN (1:5,000), rabbit polyclonal anti-Ser 473 phospho-AKT (1:1000), rabbit polyclonal anti-AKT (1/100), rabbit monoclonal anti phospho-ERK ½ (1:500), anti-MAP Kinase ½ (ERK ½) (1:1000). After being rinsed, the membranes were incubated with anti mouse (1:5,000) or anti rabbit (1:5,000) secondary antibodies conjugated with peroxidase. After the use of the primary antibodies, the antibody-antigen complexes were broken via incubation in a dissociation solution then the membranes were again incubated with the rabbit anti-AKT and anti-MAP Kinase ½ (ERK ½) antibodies (1:1000). The antibody complexes were revealed via chemiluminescence and were imaged by a digital image acquisition device of a sample of gel, membrane or film. The optical density of each specific band was quantified with image processing software by subtracting the background and by normalizing with the optical density of the β-actin bands. For the controls treated with the vehicle, the values obtained were determined at 1 and the values of the other groups were normalized in relation to these controls and expresses as a relative quantity. The animals coming from each group were obtained by conducting independent experiments and by using different membranes on which each group was compared with the controls. The quantitative values of pAKT at the Plantaris represent 3 mice per group treated with the vehicle (control or SMA) and 4 mice treated with BIO101. The quantitative values of pERK at the Plantaris represent at least 4 mice per group. The quantitative values of SMN represent n=2. Concerning the quantitative values of pAKT at the spinal cord, they represent n=2 mice per group for pAKT and pERK, while they represent n=4 per group for the level of SMN.

The molecular analysis in the muscle Plantaris confirms that the AKT pathway is indeed under-activated (FIGS. 5A and 5B) to the benefit of the ERK pathway (FIGS. 5C and 5D) in SMA mice in relation to vehicle control mice (CTL VH) (Branchu et al., 2013). The 11-day treatment with BIO101 makes it possible to inverse this relationship in the muscles of mice treated from P0 to P11 by very substantially increasing the phosphorylation of AKT (pAKT) (FIG. 5B) while the level of phosphorylation of ERK (PERK) is greatly decreased (FIG. 5D). This beneficial and already-demonstrated beneficial situation as involved in the overexpression of the SMN protein (Branchu et al., 2013). As expected, the SMN protein is practically not expressed in SMA animals in relation to healthy control animals. However, and entirely surprisingly, no modification in the level of expression of SMN was able to be observed after a treatment with BIO101, suggesting an original molecular regulation (FIGS. 5E and 5F).

This balance of the signaling pathways between ERK and AKT is also found at the spinal cord of SMA mice. Indeed, a clear decrease is observed in the phosphorylation of AKT (pAKT) in SMA mice (FIGS. 6A and 6B) in relation to healthy control mice (CTL VH) while the phosphorylation of ERK (pERK) increases (FIGS. 6C and 6D). The daily treatment of SMA mice, for 11 days with BIO101, partially restores this balance in the spinal cord of the animals by increasing the level of pAKT and by decreasing that of pERK (FIGS. 6B and 6D). Expectedly in this model, the SMN protein is not expressed in SMA mice. As observed in the muscle Plantaris, the treatment with BIO101 does not allow for the restoration of the level of SMN in SMA mice treated for 11 days (FIGS. 6E and 6F).

d. Analysis of Motor Neurons

A quantitative and qualitative study of the populations of motor neurons on thick cross-sections of the lumbar region of the spinal cord (L1-L5) of healthy control mice or SMA treated with the vehicle or with BIO101 for 11 days was carried out via immunofluorescent labeling with Choline AcetylTransferase (ChAT) such as was described hereinabove (Biondi et al., 2008; Boyer et al., 2013). The analysis was then refined by a study of the different motor neuron sub-populations by characterizing their location in the spinal cord (lateral or medial position), as well as the distribution of the size of their soma.

The anesthetized mice underwent an intracardiac infusion with PBS. The spinal cords of the mice were taken, fixed then rinsed. The lumbar region of the spinal cords (L1-L5) was coated in a 4% solution of agarose. 50 μm cross-sections were made using a vibratome over the entire length of the sample. One section every 5 sections of spinal cord was then used for the immunohistochemical analyses. After a saturation with 0.1M glycine, the tissues were then permeabilized, blocked then marked with a goat polyclonal primary antibody anti-choline acetyltransferase (ChAT) ($1/400^e$). The sections are then washed then incubated with the anti-goat polyclonal secondary antibody coupled with Cyanine 3 ($1:400^e$). The cores are marked using Bisbenzimide ($1/1,000^e$) then the sections are washed again before being mounted with a photobleaching inhibitor of the fluorescent dyes. The specificity of the marking is verified thanks to a control marking carried out in the absence of the primary antibody.

The images were obtained using a camera mounted on a microscope with a magnification of ×200 and coupled to a central processing unit of the microcomputer type comprising in particular a suitable software for image acquisition. All of the counts were carried out using image processing software.

In immunofluorescence, the motor neurons marked with the anti-ChAT antibody can indeed be identified in light grey in the figures at the ventral horn of the spinal cord (FIGS. 7A, 7B and 7C). The number of motor neurons per section by semi-ventral spinal cord was determined for each one of the three groups of mice. Expectedly, the number of motor neurons (n=5) of SMA mice decreases significantly (FIG. 7B) in relation to the number of motor neurons (n=5) found in the group of healthy control mice (FIG. 7A). Indeed, this motor neuron degeneration is 25% between these two groups (p<0.05) (FIG. 7D). In a highly interesting way, It is observed after 11 days of daily treatment with BIO101, that the number of motor neurons is significantly higher (p<0.05) in these SMA mice (FIG. 7C) than in SMA mice treated with the vehicle (n=5). Thus, it is observed that the treatment with BIO101 significantly limits the degeneration of the motor neurons due to the pathology and that the treatment exerts a significant neuroprotective effect with a loss of motor neurons that is limited to 13% in the group treated with the molecule BIO101 (FIG. 7D).

The quantitative analysis was then refined, on the one hand, by studying the different motor neuron sub-populations by analyzing their location in the spinal cord (lateral or medial position), and on the other hand, by studying the distribution of the surface of their soma.

It is observed that the number of lateral motor neurons (that innervate the distal muscles) is higher in SMA mice treated with BIO101 in relation to SMA mice who received the vehicle, while there is no significant effect on the medial motor neurons (FIG. 7E).

The analysis of the surface of the soma of the motor neurons shows, as expected, an atrophy of the motor neurons in SMA mice treated with the vehicle in relation to healthy control mice with a significant increase in the number of motor neurons having a surface of their soma less than 600 $\mu m^2$ (p<0.05). In parallel, it is observed in SMA mice a loss of the motor neurons having a soma with a surface greater than 900 $\mu m^2$ (p<0.05) (FIG. 7F). The treatment with BIO101 makes it possible to limit this atrophy of the motor neurons by significantly limiting the number of small motor neurons with a soma surface less than 300 $\mu m^2$ (p<0.05) (FIG. 7F). It is important to note that, in the framework of SLA, it was described that the motor units are not affected homogeneously by the pathological process. Indeed, the pre-symptomatic murine model of the disease revealed the preferred degeneration of motor units of the FF (Fast Fatigable) type calling motor neurons into play with a soma with a large surface (Pun et al., 2006). A similar differential degeneration was also reported in patients (Dengler et al., 1990; Theys, Peeters and Robberecht, 1999). Thus, decreasing the proportion of motor neurons with a small surface to the benefit of those with a larger soma surface could be an interesting approach in the framework of a pathology such as SLA.

In a manner complementary to the quantitative analysis of the number of motor neurons and of the size of their soma as well as the qualitative study concerning their location (medial or lateral in the ventral spinal cord), we studied the impact of the treatment by BIO101 on the protection of the sub-populations of motor neurons (slow motor neurons, intermediate motor neurons and fast motor neurons). This qualitative analysis of the sub-populations of motor neurons was carried out on thick cross-sections of the lumbar region of the spinal cord (L1-L5) of control or SMA mice treated or not with BIO101 by immunofluorescent labeling with Choline Acetyltransferase such as was described hereinabove (Biondi et al., 2008; Branchu et al., 2013) as well as an analysis of the type of motor neurons by immunofluorescence co-labeling with Estrogen-related receptor-β (ERRβ), a specific marker of the slow motor neurons, or with Matrix metallopeptidase 9 (MMP9), a specific marker of the fast motor neurons.

The anesthetized mice underwent an intracardiac infusion with PBS. The spinal cords of the mice were taken, fixed then rinsed. The lumbar region of the spinal cords (L1-L5) was coated in a 4% solution of agarose. 50 µm cross-sections were made using a vibratome over the entire length of the sample. One section every 5 sections of spinal cord was then used for the immunohistochemical analyses. After a saturation with 0.1M glycine, the tissues were then permeabilized, blocked then marked with the following primary antibodies: goat anti-ChAT antibody ($1/400e$), mouse anti-ERRβ antibody ($1/400^e$), rabbit anti-MMP9 antibody ($1/600^e$). After three rinsings, the following antibodies are incubated with the sections: donkey anti-goat Cy5 antibody ($1/400^e$), donkey anti-mouse Alexa 488 antibody ($1/400^e$), donkey anti-rabbit Cy3 antibody ($1/400^e$). The cores are marked using Bisbenzimide ($1/1,000e$) then the sections are washed again before being mounted with a photobleaching inhibitor of the fluorescent dyes. The specificity of the marking is verified thanks to a control marking carried out in the absence of the primary antibody.

The images were obtained using a camera mounted on a microscope with a magnification of ×200 and coupled to a central processing unit of the microcomputer type comprising in particular a suitable software for image acquisition. All of the counts were carried out using image processing software.

The number of slow motor neurons (ChAT+ERRβ+) does not vary significantly in the groups, whether it be healthy mice treated with the vehicle, SMA mice treated with the vehicle or with BIO101 (FIG. 8). In the group of SMA animals treated with the vehicle, a significant loss is observed in the average number of fast motor neurons (ChAT+MMP9+) in relation to the group of healthy control mice (11 versus 16 respectively; $p<0.05$). This loss occurs to the benefit of the motor neurons of the intermediate type (ChAT+ERRb−MMP9−) of which the number is significantly higher in the group of SMA vehicle mice in comparison with the number present in healthy control mice (7 versus 4; $p<0.05$).

Interestingly, the treatment with BIO101 of SMA mice preferably favors the survival of the motor neurons of the fast type (ChAT+MMP9+). Indeed, in the group of SMA mice treated with BIO101, the number of fast motor neurons is significantly higher than in the group of SMA mice having received the vehicle (14 versus 11; $p<0.05$). Consequently, the treatment with BIO101 limits the motor neuron loss observed in this severe SMA model, in particular by protecting the mice from the loss of fast motor neurons.

e. Analysis of the Neuromuscular Junctions

SMA is characterized by a specific alteration of the neuromuscular junctions induced by the lack of SMN protein and by the denervation induced by the specific death of the motor neurons (Kariya et al., 2008; Biondi et al., 2008; Chali et al., 2016). We conducted a morphological study of the neuromuscular junctions in order to determine the degree of maturation and the fragmentation of the so called "pretzel" mature structure. For this, we carried out specific markings of the pre-synaptic (Synaptophysine and Neurofilament) and post-synaptic (α-bungarotoxin) faces via immunofluorescence (Leroy et al., 2014), on dilacerated muscle fibers of the muscles soleus, plantaris and tibialis of SMA mice treated or not, with the molecule BIO101.

Longitudinal sections 75 µm thick were realized with the vibratome. The sections were then saturated in 0.1M glycine with a low stirring then washed with PBS. They were then blocked and permeabilized with a solution of PBS-BSA 4%-goat serum 5%-triton 0.5%. The anti-neurofilament) ($1/800^e$ and anti-synaptophysin (SNAP25; $1/200^e$) primary antibodies (in order to identify the pre-synaptic face of the neuromuscular junction) are incubated for 48 hours and revealed with a secondary antibody (Anti-lapin AlexaFluor® 647; $1/400^e$) then washed. Finally, the sections are then incubated with an anti α-bungarotoxin directly coupled with AlexaFluor® 555 ($1/500^e$). The sections are washed, and the cores are marked with bisbenzimide ($1/1,000e$) then mounted between cover glass and glass slides with a photobleaching inhibitor of the fluorescent dyes for an observation in microscopic epifluorescence imaging (FIG. 9A).

Neuromuscular junctions are defined and quantified according to three categories, from the most immatures to the most mature: uniform plate, perforated or of "pretzel" shape.

In all the muscles studied (Plantaris, Soleus, and Tibialis), the percentage of uniform neuromuscular junctions in SMA animals is greatly increased in relation to healthy control mice. This delay in maturation of the neuromuscular junctions is expected and has already been described in literature (Biondi et al., 2008). Indeed, in the rapid extensor muscle Plantaris, the percentage of immature neuromuscular junctions at P10 is 89.7% versus 49.7% chez of healthy control mice ($p<0.05$) (FIG. 9B), in the slow extensor muscle Soleus, the percentage of immature neuromuscular junctions is 84.3% versus 45.7% chez of healthy control mice ($p<0.05$) (FIG. 9C), in the fast flexor muscle Tibialis, the percentage of immature neuromuscular junctions is 69.3% versus 28.7% chez of healthy control mice ($p<0.05$) (FIG. 9D). When the SMA mice are treated daily with BIO101, from their birth to P10, a more substantial maturation is observed in the neuromuscular junctions in all the muscles tested, with a decrease in the percentage of immature plates to the benefit of perforated plates, which bear witness to an acceleration in the maturation. Indeed, in the muscle plantaris, 16.3% of the junctions are of the perforated type compared to 10.4% in SMA animals having received the vehicle (p=ns) (FIG. 9B). This difference is significant in the muscles Soleus (26.5% of the junctions perforated in the SMA group compared to 15.7% in the group of SMA mice treated with the vehicle, $p<0.05$, FIG. 9C) and in the Tibialis (45.7% perforated junctions in the treated SMA group compared to 30.7% in the group of SMA mice treated with the vehicle, $p<0.05$, FIG. 9D).

Thus, these results show that the treatment with BIO101 accelerates the maturation of the neuromuscular junctions.

f. Analysis of the Motor Capacities in a Severe SMA Mouse Model

Phenotypic analyses of type 2 severe SMA mice treated or not starting from P0 with BIO101 were conducted. Longitudinally every two days, a test was conducted of the motor capacities of the mice from P5 to P9. The inventors evaluated the spontaneous displacement capacities by the open-field test, as well as the muscular fatigability by grip test, such as described hereinabove (Biondi et al., 2008; Branchu et al., 2013; Chali et al., 2016).

The device used for the open-field test is different according to the age of the mice. For animals from P0 to P6, it is formed of a 15×15×5 cm plastic box with a grid pattern of the field divided into 25 3 cm×3 cm squares. For animals from P7 to P21, it is formed of a 28×28×5 cm plastic box with a grid pattern of the field divided into 16 7 cm×7 cm squares. The mice were tested individually and the evaluation device was washed after each session. Each mouse initially placed at the center of the field was able to move about freely for 5 minutes. The behavioral measurements are recorded by the experimenter during these 5 minutes and the total number of squares crossed was recorded.

Expectedly, at all the times tested (P5, P7 and P9) the SMA mice treated with the vehicle show significantly decreased motor performance in relation to healthy control mice (FIG. 10A). Indeed, the number of squares that they are able to cross is 10 at P5, 6 at P7 and 8 at P9 versus 17 at P5, 12 at P7 and 24 at P9 in the group of healthy control mice (with $p<0.01$, $p<0.0001$ and $p<0.001$ respectively). At P5, the treatment with BIO101 of SMA mice does not improve their motor performance (11 squares) in relation to SMA mice treated with the vehicle (10 squares). At P7, the mobility of the mice treated with BIO101 increases significantly (10 squares crossed) in relation to SMA mice having received the vehicle (6 squares crossed with $p<0.05$). At P9, this difference is not significant but the treatment with BIO101 tends to have a beneficial effect with mice that are able to cross 11 squares in the group of SMA mice BIO101 in relation to 8 squares in the SMA Vehicle group, p=ns). In order to evaluate muscular fatigability, the gripping force of the hind feet of the mice was tested from P5 to P9 (grip test). The mice are suspended via their hind feet from a thin metal rod suspended in the air, horizontally. The time spent hanging on is recorded. Each mouse was subjected to five successive attempts with a rest period of one minute between two tests. Only the best test was retained for the evaluation of the muscular functions.

Muscular fatigability, tested via the grip test, shows, expectedly, that the SMA mice treated with the vehicle have a significantly reduced muscular function in relation to healthy control mice (FIG. 10B). Indeed, the time during which they are able to remain suspended from the metal rod is 0.2 seconds at P5, 6.2 seconds at P7 and 5.6 seconds at P9 versus 3.3 seconds at P5, 11.4 seconds at P7 and 16.1 seconds at P9 in the group of healthy control mice (with $p<0.01$, $p<0.01$ and $p<0.001$ respectively). At P5, the treatment with BIO101 of SMA mice significantly improves their muscular performance (2.3 seconds) in relation to SMA mice treated with the vehicle (0.2 seconds; $p<0.05$). At P7, the treatment with BIO101 tends to increase, but non-significantly, the hanging time of SMA mice in relation to SMA mice having received the vehicle (12.2 seconds versus 6.2 seconds respectively with p=ns). Finally, at P9, BIO101 very significantly improves this parameter in the mice treated with BIO101 (20.9 seconds) in relation to SMA mice treated with the vehicle (5.6 seconds, with $p<0.01$).

In conclusion, BIO101 has beneficial effects on voluntary motricity as well as on muscular fatigability of the SMA animals.

g. Phenotypic Analysis of the Effects of BIO103

The same type II murine model was used to characterize the phenotypic effects of the molecule BIO103 in a severe SMA model. The mice were treated via daily gavage of a dose of 50 mg/kg, either with the molecule BIO103 complexed with the vehicle (cyclodextrin in the present case), or with the vehicle alone (VH). The weight and the survival were analyzed on a daily basis until P11.

The results demonstrate that BIO103 (n=12), in daily oral treatment from birth of the mice, tends to limit the loss of weight of the animals although the difference does not reach the significance threshold, in comparison with animals treated with the vehicle (n=22) (FIG. 11A). On the other hand, significantly ($p<0.05$), BIO103 increases the pre-P11 survival of the animals treated (66.6% survival at P11) in relation to mice having received the vehicle (36.3% survival at P11) (FIG. 11B).

f. Analysis of the Muscular Trophic Effects of BIO103

The histological analysis of the Hematoxyline Eosin stained cross-sections of the sampled muscles shows a beneficial effect of BIO103 on muscular atrophy (cross-section surface of the muscle fibers).

In the same way as with the molecule BIO101, the muscular atrophy present in the SMA mice is limited by the treatment, regardless of the nature and the typology of the muscles. Indeed, the treatment with BIO103 makes it possible to significantly limit the atrophy of the three muscles studied.

The quantification of the surface of the muscle fibers shows, expectedly, that this atrophy is highly marked and is 56.1% in the Tibialis of SMA mice (n=4) in relation to control mice (n=4). This atrophy is significantly reduced ($p<0.05$) to 22.1% at P11 thanks to a treatment with BIO103 (n=4) (FIG. 12A). The same applies for the Plantaris for which significant atrophy of the muscle fibers of 46% in SMA mice is observed in relation to healthy control mice ($p<0.05$) and the treatment with BIO103 significantly limits this atrophy to 15.3% ($p<0.05$) (FIG. 12B) and in the Soleus (50.2% for SMA mice compared to the control ($p<0.01$) versus 37.1% with a treatment with BIO103, $p<0.05$) (FIG. 12C).

In order to conduct a finer analysis of the effects of BIO103 on atrophy, the distribution of the muscle fibers by cross-section surface categories was evaluated. The significant decrease in atrophy by the molecule BIO103 observed with a treatment of SMA mice from P0 to P11, results in a significant effect of this treatment on the distribution of the fibers according to their cross-section surface in the three muscles studied of SMA mice treated with BIO103 in comparison with the SMA mice treated with the vehicle (FIGS. 13A, 13B and 13C). In the muscle Tibialis of SMA mice treated with BIO103 from P0 to P11, a significant increase is observed in the proportion of fibers that have a cross-section surface greater than 400 $\mu m^2$ while the proportion of small fibers having a cross-section surface less than 200 $\mu m^2$ decreases significantly ($p<0.05$) in relation to the group of SMA vehicle mice (FIG. 13A). In the muscle Plantaris (FIG. 13B) and in the Soleus (FIG. 13C) of SMAs treated with BIO101 from P0 to P11, an increase in the proportion of muscle fibers having a cross-section surface greater than 300 $\mu m^2$ is observed accompanied by a decrease in those that have a cross-section surface less than 200 $\mu m^2$.

4. Conclusion

In light of the properties of BIO101 and of BIO103 on aplasia, muscular atrophy and on the degeneration of the motor neurons of mammals suffering from infantile spinal muscular atrophy, the use of phytoecdysones, and in particular BIO101 and BIO103 can therefore be proposed, alone or as a complement to a treatment aimed at correcting the effects of a genetic alteration, in order to preserve muscle tissue as well as the motor neurons, and as such slow down the change in neuromuscular diseases which have for consequence the deterioration in muscular function and/or motor neuron loss. Neuromuscular diseases include in particular amyotrophic lateral sclerosis as well as spinal muscular atrophy.

More generally, it is to be noted that the modes for implementing and carrying out the invention considered hereinabove were described by way of non-limiting examples and that other alternatives can consequently be considered.

BIBLIOGRAPHICAL REFERENCES

Akten B, Kye M J, Hao Ie T, Wertz M H, Singh S; et al. Interaction of survival of motor neuron (SMN) and HuD proteins with mRNA cpg15 rescues motor neuron axonal deficits. Proc. Natl. Acad. Sci. USA (2011); 108:10337-42.

Al-Chalabi A & Hardiman O. The epidemiology of ALS: a conspiracy of genes, environment and time. Nat. Rev. Neurol. (2013); 9:617-28.

Bevan A K, Hutchinson K R, Foust K D, Braun L, McGovern V L, et al. Early heart failure in the SMNDelta7 model of spinal muscular atrophy and correction by postnatal scAAV9-SMN delivery. Hum. Mol. Genet. (2010); 19:3895-905.

Biondi O, Grondard C, Lécolle S, Deforges S, Pariset C, et al. Exercise-induced activation of NMDA receptor promotes motor unit development and survival in a type 2 spinal muscular atrophy model mouse. J. Neurosci. (2008); 28:953-62.

Biondi O, Lopes P, Desseille C, Branchu J, Chali F, et al. Physical exercise reduces cardiac defects in type 2 spinal muscular atrophy-like mice. J. Physiol. (2012); 590:5907-25.

Boyer J G, Murray L M, Scott K, De Repentigny Y, Renaud J M, Kothary R. Early onset muscle weakness and disruption of muscle proteins in mouse models of spinal muscular atrophy. Skelet. Muscle (2013); 3:24.

Branchu J, Biondi O, Chali F, Collin T, Leroy F, et al. Shift from extracellular signal-regulated kinase to AKT/cAMP response element-binding protein pathway increases survival-motor-neuron expression in spinal-muscular-atrophy-like mice and patient cells. J. Neurosci. (2013); 33:4280-94.

Buhler D, Raker V, Luhrmann R & Fischer U. Essential role for the tudor domain of SMN in spliceosomal U snRNP assembly: implications for spinal muscular atrophy. Hum. Mol. Genet. (1999); 8:2351-7.

Chali, F. et al. Long-term exercise-specific neuroprotection in spinal muscular atrophy-like mice. J Physiol 594, 1931-1952 (2016).

Chiriboga C A, Swoboda K J, Darras B T, Iannaccone S T, Montes J, et al. Results from a phase 1 study of nusinersen (ISIS-SMN(Rx)) in children with spinal muscular atrophy. Neurology (2016); 86:890-7.

Cifuentes-Diaz C, Frugier T, Tiziano F D, Lacène E, Robiot N, et al. Deletion of murine SMN exon 7 directed to skeletal muscle leads to severe muscular dystrophy. J. Cell Biol. (2001); 152:1107-14.

Crawford T O & Pardo C A. The neurobiology of childhood spinal muscular atrophy. Neurobiol. Dis. (1996); 3:97-110.

Dengler R, Konstanzer A, Küthe G, Hesse S, Wolf W, Struppler A. Amyotrophic lateral sclerosis: macro-EMG and twitch forces of single motor units. Muscle Nerve (1990); 13 (6): 545-50.

Fidzianska A, Rafalowska J, Glinka Z. Ultrastructural study of motoneurons in Werdnig-Hoffmann disease. Clin. Neuropathol. (1984); 3:260-5.

Finkel R S, Chiriboga C A, Vaisar J, Day J W, Montes J, et al. Treatment of infantile-onset spinal muscular atrophy with nusinersen: a phase 2, open-label, dose-escalation study. Lancet (2016); 388:3017-26.

Frugier T, Tiziano F D, Cifuentes-Diaz C, Miniou P, Roblot N, et al. Nuclear targeting defect of SMN lacking the C-terminus in a mouse model of spinal muscular atrophy. Hum. Mol. Genet. (2000); 9:849-58.

Gorelick-Feldman J, MacLean D, Ilic N, Poulev A, Lila M A, Cheng D, Raskin I. Phytoecdysteroids increase protein synthesis in skeletal muscle cells. J. Agric. Food Chem. (2008); 56:3532-37.

Greensmith L & Vrbova G. Alterations of nerve-muscle interaction during postnatal development influence motoneurone survival in rats. Brain Res. Dev. Brain Res. (1992); 69(1):125-31 (1992).

Grice S J & Liu J L. Survival motor neuron protein regulates stem cell division, proliferation, and differentiation in *Drosophila*. PLoS Genetics (2011) 7: e1002030.

Hache M, Swoboda K J, Sethna N, Farrow-Gillespie A, Khandji A, et al. Intrathecal Injections in Children With Spinal Muscular Atrophy: Nusinersen Clinical Trial Experience. J. Child Neurol. (2016); 31:899-906.

Heier C R, Satta R, Lutz C, DiDonato C J. Arrhythmia and cardiac defects are a feature of spinal muscular atrophy model mice. Hum. Mol. Genet. (2010); 19:3906-18.

Hsieh-Li H M, Chang J G, Jong Y J, Wu M H, Wang N M, et al. A mouse model for spinal muscular atrophy. Nat. Genet. (2000); 24:66-70.

Hua Y, Sahashi K, Hung G, Rigo F, Passini M A, et al. Antisense correction of SMN2 splicing in the CNS rescues necrosis in a type III SMA mouse model. Genes Dev. (2010); 24:1634-44.

Hunter G, Aghamaleky Sarvestany A, Roche S L, Symes R C, Gillingwater T H. SMN-dependent intrinsic defects in Schwann cells in mouse models of spinal muscular atrophy. Hum. Mol. Genet. (2014); 23:2235-50.

Hwee D T, Kennedy A R, Hartman J J, Ryans J, Durham N, et al. The small-molecule fast skeletal troponin activator, CK-2127107, improves exercise tolerance in a rat model of heart failure. J. Pharmacol. Exp. Ther. (2015); 353: 159-68.

Kariya S, Park G H, Maeno-Hikichi Y, Leykekhman O, Lutz C, Arkovitz M S et al. Reduced SMN protein impairs maturation of the neuromuscular junctions in mouse models of spinal muscular atrophy. Hum. Mol. Genet. (2008); 17(16):2552-69.

Kong L, Wang X, Choe D W, Polley M, Burnett B G, et al. Impaired synaptic vesicle release and immaturity of neuromuscular junctions in spinal muscular atrophy mice. J. Neurosci. (2009); 29:842-51.

Lawrence M M. *Ajuga turkestanica* as a countermeasure against sarcopenia and dynapenia. M S thesis, Appalachian State University (2012).

Lee Y I, Mikesh M, Smith I, Rimer M, Thompson W. Muscles in a mouse model of spinal muscular atrophy show profound defects in neuromuscular development even in the absence of failure in neuromuscular transmission or loss of motor neurons. Dev. Biol. (2011); 356:432-44.

Lefebvre S, Burlet P, Liu Q, Beltrandy S, Clermont O, et al. Correlation between severity and SMN protein level in spinal muscular atrophy. Nat. Genet. (1997); 16:265-9.

Leroy, F. et al. Early intrinsic hyperexcitability does not contribute to motoneuron degeneration in amyotrophic lateral sclerosis *eLife*. 3, e04046 (2014).

Liu Q, Fischer U, Wang F, Dreyfuss G. The spinal muscular atrophy disease gene product, SMN, and its associated protein SIP1 are in a complex with spliceosomal snRNP proteins. Cell (1997); 90:1013-21.

Lorson C L, Strasswimmer J, Yao J M, Baleja J D, Hahnen E, et al. SMN oligomerization defect correlates with spinal muscular atrophy severity. Nat. Genet. (1998); 19:63-6.

Mcwhorter M L, Monani U R, Burghes A H, Beattie C E. Knockdown of the survival motor neuron (Smn) protein in zebrafish causes defects in motor axon outgrowth and pathfinding. J. Cell Biol. (2003); 162:919-31.

Murray L M, Comley L H, Thomson D, Parkinson N, Talbot K, Gillingwater T H. Selective vulnerability of motor neurons and dissociation of pre- and post-synaptic pathology at the neuromuscular junction in mouse models of spinal muscular atrophy. Hum. Mol. Genet. (2008); 17:949-62.

Nicole S, Desforges B, Millet G, Lesbordes J, Cifuentes-Diaz C, et al. Intact satellite cells lead to remarkable protection against Smn gene defect in differentiated skeletal muscle. J. Cell Biol. '2003); 161:571-82.

Passini M A, Bu J, Richards A M, Kinnecom C, Sardi S P, et al. Antisense oligonucleotides delivered to the mouse CNS ameliorate symptoms of severe spinal muscular atrophy. Sci. Transl. Med. (2011); 3: 72ra18.

Peter C J, Evans M, Thayanithy V, Taniguchi-Ishigaki N, Bach I, et al. The COPI vesicle complex binds and moves with survival motor neuron within axons. Hum. Mol. Genet. (2011); 20:1701-11.

Pun S, Santos A F, Saxena S, Xu L, Caroni P. Selective Vulnerability and Pruning of Phasic Motoneuron Axons in Motoneuron Disease Alleviated by CNTF. Nature Neuroscience (2006); 9 (3):408-19.

Rajendra T K, Gonsalvez G B, Walker M P, Shpargel K B, Salz H K, Matera A G. A *Drosophila melanogaster* model of spinal muscular atrophy reveals a function for SMN in striated muscle. J. Cell Biol. (2007); 176:831-41.

Rindt H, Feng Z, Mazzasette C, Glascock J J, Valdivia D, et al. Astrocytes influence the severity of spinal muscular atrophy. Hum. Mol. Genet. (2015); 24:4094-102.

Sanchez G, Dury A Y, Murray L M, Biondi O, Tadesse H, et al. A novel function for the survival motoneuron protein as a translational regulator. Hum. Mol. Genet. (2013); 22:668-84.

Shababi M, Habibi J, Yang H T, Vale S M, Sewell W A, Lorson C L. Cardiac defects contribute to the pathology of spinal muscular atrophy models. Hum. Mol. Genet. (2010); 19:4059-71.

Shafey D, Cote P D, Kothary R. Hypomorphic Smn knockdown C2C12 myoblasts reveal intrinsic defects in myoblast fusion and myotube morphology. Exp. Cell Res. (2005); 311:49-61.

Simakin S Yu, Panyushkin V V, Portugalov S N, Kostina L V, Martisorov E G. Combined application of preparation Ecdysten. Science Bulletin (1998); No 2, 29-31.

Somers E, Lees R D, Hoban K, Steigh J N, Zhou H, et al. Vascular Defects and Spinal Cord Hypoxia in Spinal Muscular Atrophy. Ann. Neurol. (2016); 79:217-30.

Syrov V N. Comparative experimental investigations of the anabolic activity of ecdysteroids and steranabols. Pharm. Chem. J. (2000); 34(4):193-197.

Theys P A, Peeters E, Robberecht W. Evolution of Motor and Sensory Deficits in Amyotrophic Lateral Sclerosis Estimated by Neurophysiological Techniques. J. Neurol. (1999); 246 (6):438-42.

Torres-Benito L, Neher M F, Cano R, Ruiz R, Tabares L. SMN requirement for synaptic vesicle, active zone and microtubule postnatal organization in motor nerve terminals. *PLoS One* (2011); 6:e26164.

Tóth N, Szabó A, Kacsala P, Héger J, Zádor E. 20-Hydroxyecdysone increases fiber size in a muscle-specific fashion in rat. Phytomedicine (2008); 15:691-8.

Vitte J, Fassier C, Tiziano F D, Dalard C, Soave S, et al. Refined characterization of the expression and stability of the SMN gene products. Am J Pathol (2007); 171:1269-80.

Vitte J M, Davoult B, Roblot N, Mayer M, Joshi V, et al. Deletion of murine Smn exon 7 directed to liver leads to severe defect of liver development associated with iron overload. Am. J. Pathol. (2004); 165:1731-41.

Vrbova G, Fisher T J. The Effect of Inhibiting the Calcium Activated Neutral Protease, on Motor Unit Size after Partial Denervation of the Rat Soleus Muscle. Eur. J. Neurosci. (1989); 1:616-25.

Walker M P, Rajendra T K, Saieva L, Fuentes J L, Pellizzoni L, Matera A G. SMN complex localizes to the sarcomeric Z-disc and is a proteolytic target of calpain. Hum. Mol. Genet. (2008); 17:3399-410.

Zhang Z, Lotti F, Dittmar K, Younis I, Wan L, et al. SMN deficiency causes tissue-specific perturbations in the repertoire of snRNAs and widespread defects in splicing. Cell (2008); 133:585-600.

The invention claimed is:

1. A method of treatment of a specific disorder of the motor neurons in mammals suffering from a neuromuscular disease including an alteration of the muscular function due to the specific disorder of the motor neurons, wherein said neuromuscular disease is spinal muscular atrophy (SMA), said method comprising the step of administering to a subject in need thereof an effective dose of a composition comprising at least 20-hydroxyecdysone and/or at least one semi-synthetic derivative of 20-hydroxyecdysone of the general formula (I):

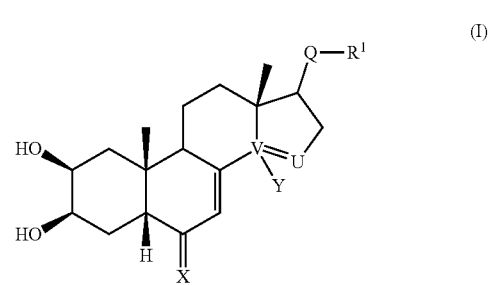

wherein:
V—U is a carbon-carbon single bond and Y is a hydroxyl group or a hydrogen, or V—U is an ethylenic C=C bond;
X is an oxygen;
Q is a carbonyl group;
$R^1$ is chosen from:
- a $(C_1-C_6)W(C_1-C_6)$ group;
- a $(C_1-C_6)W(C_1-C_6)W(C_1-C_6)$ group;
- a $(C_1-C_6)W(C_1-C_6)CO_2(C_1-C_6)$ group;
- a $(C_1-C_6)A$ group, A representing a heterocycle optionally substituted with a group of the type OH, OMe, $(C_1-C_6)$, $N(C_1-C_6)$, $CO_2(C_1-C_6)$;
- a $CH_2Br$ group;

W being a heteroatom chosen from N, O and S.

2. The method as claimed in claim 1, wherein the 20-hydroxyecdysone is included in a plant extract or an extract of a plant part, said plant being chosen from plants containing at least 0.5% of 20-hydroxyecdysone by dry weight of said plant, said extract including at least 95% of 20-hydroxyecdysone.

3. The method as claimed in claim 2, wherein the composition includes remarkably between 0 and 0.05%, by dry weight of the extract, of impurities able to affect the safety, the availability or the efficacy of a pharmaceutical application of said extract.

4. The method according to claim 2, wherein the plant is chosen from *Stemmacantha carthamoides, Cyanotis arachnoidea* and *Cyanotis vaga*.

5. The method according to claim 1, wherein the alteration of the muscular function is generated by an alteration of the motor neurons function or the degeneration thereof.

6. The method according to claim 1, wherein the disorder of the motor neurons results from a genetic alteration in mammals suffering from spinal muscular atrophy.

7. The method according to claim 1, wherein the altered muscular function is that of striated skeletal muscle or of the myocardium.

8. The method according to claim 1, wherein the alteration of the muscular function is linked to aplasia and/or atrophy.

9. The method according to claim 1, wherein 20-hydroxyecdysone and/or said at least one semi-synthetic derivative of 20-hydroxyecdysone of the general formula (I) is used to treat at least one genetic alteration responsible for SMA.

10. The method according to claim 1, wherein spinal muscular atrophy results from a mutation of the gene SMN1.

11. The method according to claim 1, wherein the treatment of the specific disorder of the motor neurons includes the improvement in motor neuron survival and/or the acceleration in the maturation of the neuromuscular junctions.

12. The method according to claim 1, wherein 20-hydroxyecdysone and/or said at least one semi-synthetic derivative of 20-hydroxyecdysone of the general formula (I) is administered at a dose comprised between 3 and 15 milligrams per kilogram per day in humans.

13. The method according to claim 1, wherein 20-hydroxyecdysone and/or said at least one semi-synthetic derivative of 20-hydroxyecdysone of the general formula (I) is administered at a dose of 200 to 1000 mg/day, divided into one or more doses, in human adults, and a dose of 5 to 350 mg/day, divided into one or more doses, in human children or infants.

14. The method according to claim 1, wherein in the general formula (I):
Y is a hydroxyl group;
$R^1$ is chosen from:
- a $(C_1-C_6)W(C_1-C_6)$ group;
- a $(C_1-C_6)W(C_1-C_6)W(C_1-C_6)$ group;
- a $(C_1-C_6)W(C_1-C_6)CO_2(C_1-C_6)$ group;
- a $(C_1-C_6)A$ group, A representing a heterocycle optionally substituted with a group of the OH, OMe, $(C_1-C_6)$, $N(C_1-C_6)$, $CO_2(C_1-C_6)$ type;

W being a heteroatom chosen from N, O and S.

15. The method according to claim 1, wherein said at least one semi-synthetic derivative of 20-hydroxyecdysone of the general formula (I) is chosen from:
- no. 1: (2S,3R,5R,10R,13R,14S,17S)-2,3,14-trihydroxy-10,13-dimethyl-17-(2-morpholinoacetyl)-2,3,4,5,9,11,12,15,16,17-decahydro-1H-cyclopenta[a]phenanthren-6-one;
- no. 2: (2S,3R,5R,10R,13R,14S,17S)-2,3,14-trihydroxy-17-[2-(3-hydroxypyrrolidin-1-yl)acetyl]-10,13-dimethyl-2,3,4,5,9,11,12,15,16,17-decahydro-1H-cyclopenta[a]phenanthren-6-one;
- no. 3: (2S,3R,5R,10R,13R,14S,17S)-2,3,14-trihydroxy-17-[2-(4-hydroxy-1-piperidyl)acetyl]-10,13-dimethyl-2,3,4,5,9,11,12,15,16,17-decahydro-1H-cyclopenta[a]phenanthren-6-one;
- no. 4: (2S,3R,5R,10R,13R,14S,17S)-2,3,14-trihydroxy-17-[2-[4-(2-hydroxyethyl)-1-piperidyl]acetyl]-10,13-dimethyl-2,3,4,5,9,11,12,15,16,17-decahydro-1H-cyclopenta[a]phenanthren-6-one;
- no. 5: (2S,3R,5R,10R,13R,14S,17S)-17-[2-(3-dimethylaminopropyl)(methyl)amino)acetyl]-2,3,14-trihydroxy-10,13-dimethyl-2,3,4,5,9,11,12,15,16,17-decahydro-1H-cyclopenta[a]phenanthren-6-one;
- no. 6: 2-[2-oxo-2-[(2S,3R,5R,10R,13R,14S,17S)-2,3,14-trihydroxy-10,13-dimethyl-6-oxo-2,3,4,5,9,11,12,15,16,17-decahydro-1H-cyclopenta[a]phenanthren-17-yl]ethyl]ethyl sulfanylacetate;
- no. 7: (2S,3R,5R,10R,13R,14S,17S)-17-(2-ethylsulfanylacetyl)-2,3,14-trihydroxy-10,13-dimethyl-2,3,4,5,9,11,12,15,16,17-decahydro-1H-cyclopenta[a]phenanthren-6-one; and
- no. 8: (2S,3R,5R,10R,13R,14S,17S)-2,3,14-trihydroxy-17-[2-(2-hydroxyethylsulfanyl)acetyl]-10,13-dimethyl-2,3,4,5,9,11,12,15,16,17-decahydro-1H-cyclopenta[a]phenanthren-6-one.

16. The method according to claim 1, wherein the at least one semi-synthetic derivative of 20-hydroxyecdysone has the formula (II):

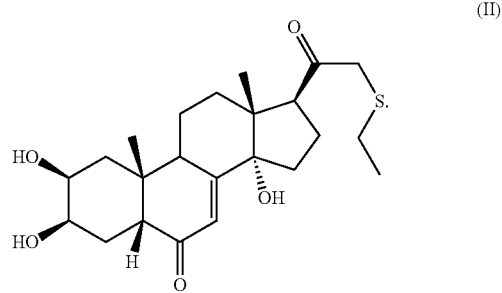 [SMILES: CCSCC(=O)[C@H]1CC[C@@]2(O)C3=CC(=O)[C@@H]4C[C@@H](O)[C@@H](O)C[C@]4(C)C3CC[C@]12C]

(II)

17. The method as claimed in claim 1, wherein the 20-hydroxyecdysone is included in a plant extract or an extract of a plant part, said plant being chosen from plants containing at least 0.5% of 20-hydroxyecdysone by dry weight of said plant, said extract including at least 97% of 20-hydroxyecdysone.

18. The method according to claim 17, wherein the plant is chosen from *Stemmacantha carthamoides, Cyanotis arachnoidea* and *Cyanotis vaga.*

\* \* \* \* \*